US00RE50695E

(19) United States
(12) Reissued Patent
Schnell et al.

(10) Patent Number: US RE50,695 E
(45) Date of Reissued Patent: Dec. 9, 2025

(54) ENCODING AN INFORMATION SIGNAL

(71) Applicant: Fraunhofer-Gesellschaft zur Foerderung der angewandten Forschung e.V., Munich (DE)

(72) Inventors: Markus Schnell, Erlangen (DE); Michael Schuldt, Germering (DE); Manfred Lutzky, Nuremberg (DE); Manuel Jander, Erlangen (DE)

(73) Assignee: Fraunhofer-Gesellschaft zur Foerderung der angewandten Forschung e.V., Munich (DE)

(21) Appl. No.: 18/225,553

(22) Filed: Jul. 24, 2023

Related U.S. Patent Documents

Reissue of:
(64) Patent No.: 8,126,721
Issued: Feb. 28, 2012
Appl. No.: 11/874,488
Filed: Oct. 18, 2007

U.S. Applications:
(60) Provisional application No. 60/862,033, filed on Oct. 18, 2006.

(51) Int. Cl.
*G10L 19/00* (2013.01)
*G10L 19/02* (2013.01)
(Continued)

(52) U.S. Cl.
CPC ..... *G10L 21/038* (2013.01)

(58) Field of Classification Search
CPC ..... G10L 21/038
See application file for complete search history.

(56) References Cited

U.S. PATENT DOCUMENTS 6,680,972 B1 * 1/2004 Liljeryd et al. ..... G10L 21/038 375/240
6,748,363 B1 * 6/2004 Lueck ..... G10L 19/022 704/229
(Continued)

FOREIGN PATENT DOCUMENTS

EP 1672618 A1 6/2006
EP 1672618 A4 6/2006
(Continued)

OTHER PUBLICATIONS

Schnell, M. et al., "Enhanced MPEG-4 Low Delay AAC—Low Bitrate High Quality Communication," May 5-8, 2007, Convention Paper 6998, Presented at the 122nâ—$_i$ AES Convention, Audio Engineering Society, XP009092156.
(Continued)

*Primary Examiner* — Luke S Wassum
(74) *Attorney, Agent, or Firm* — Perkins Coie LLP; Michael A. Glenn

(57) ABSTRACT

The transient problem may be sufficiently addressed, and for this purpose, a further delay on the side of the decoding may be reduced if a new SBR frame class is used wherein the frame boundaries are not shifted, i.e. the grid boundaries are still synchronized with the frame boundaries, but wherein a transient position indication is additionally used as a syntax element so as to be used, on the encoder and/or decoder sides, within the frames of these new frame class for determining the grid boundaries within these frames.

5 Claims, 10 Drawing Sheets

AMENDED

(51) Int. Cl.
*G10L 19/14* (2006.01)
*G10L 21/038* (2013.01)

(56) References Cited

U.S. PATENT DOCUMENTS

| | | | | |
|---|---|---|---|---|
| 6,978,236 | B1 | 12/2005 | Liljeryd et al. | G10L 19/022 704/E19.024 |
| 7,181,389 | B2 * | 2/2007 | Liljeryd et al. | G10L 19/022 704/200 |
| 7,191,121 | B2 * | 3/2007 | Liljeryd et al. | G10L 19/0208 704/200 |
| 7,451,091 | B2 * | 11/2008 | Chong et al. | H04B 1/667 381/23 |
| 8,041,578 | B2 * | 10/2011 | Schnell | G10L 19/025 704/201 |
| 8,126,721 | B2 | 2/2012 | Schnell et al. | |
| 8,417,532 | B2 * | 4/2013 | Schnell | G10L 19/025 704/211 |
| 2006/0031064 | A1 | 2/2006 | Liljeryd et al. | |
| 2006/0031065 | A1 | 2/2006 | Liljeryd et al. | |
| 2006/0256971 | A1 | 11/2006 | Chong et al. | |

FOREIGN PATENT DOCUMENTS

| | | | |
|---|---|---|---|
| JP | H06-338861 | | 12/1994 |
| JP | H06-338861 | A | 12/1994 |
| JP | H07-273658 | | 10/1995 |
| JP | H07-273658 | A | 10/1995 |
| JP | 2005-533271 | | 11/2005 |
| JP | 2005-533271 | A | 11/2005 |
| RU | 2251795 | C2 | 5/2005 |
| TW | 245061 | | 4/1995 |
| TW | 245061 | A | 4/1995 |
| TW | 315561 | | 9/1997 |
| TW | 315561 | A | 9/1997 |
| TW | 322664 | | 12/1997 |
| TW | 322664 | A | 12/1997 |
| TW | 200628001 | A | 8/2006 |
| WO | WO 00/45378 | A2 | 8/2000 |
| WO | 01/26095 | A1 | 4/2001 |
| WO | WO 01/26095 | | 4/2001 |
| WO | 01/91111 | A1 | 11/2001 |
| WO | WO 01/91111 | | 11/2001 |
| WO | WO-2008049590 | A1 * | 5/2008 ..... G10L 19/02 |

OTHER PUBLICATIONS

International Standard ISO/IEC, "Information Technology—Coding of Audio-Visual Objects," Part 3: Audio, Subpart 1, Seiten 1-120 and Subpart 4, Seiten 1-344.

"Information Technology—Coding of Audio-Visual Objects—Part 3: Audio, Amendment 1: Bandwidth Extension," Feb. 10, 2003, ISO/IEC 14496-3, ISO/IEC JTC1/SC29/WG11/N5570, International Standard, Amendment, XP 030012750.

Geiger, et al., "Information Technology—Coding of Audio-Visual Objects—Part 3: Audio, Amendment 9: Enhanced Low Delay AAC," Oct. 27, 2006, ISO/IEC 14496-3:2006/PDAM 9, ISO/IEC JTC1/SC29/WG11, MPEG2006/N8616, International Standard, Amendment, XP 002458792.

Ekstrand, P., "Bandwidth Extension of Audio Signals by Spectral Band Processing and Coding of Audio," Nov. 15, 2002, Leuven, Belgium, p. 53-58.

Russian Decision to Grant, with English Translation, dated Aug. 19, 2010, in related Russian patent application No. 2009-118384, 37 pages.

English Translation of Taiwan Office Action mailed Apr. 1, 2011 for related Taiwan application No. 096138633, 3 pages.

* cited by examiner

AMENDED

FIGURE 2

AMENDED

```
Syntax                                                    No. of bits   Mnemonic
sbr_ltd_grid(ch)
{
    switch (bs_frame_class) {                                 1          uimsbf
        case FIXFIX
            bs_num_env[ch] = 2 ^ tmp;                         2          uimsbf
                                                                         Note 1
            if (bs_num_env[ch] == 1)
                bs_amp_res = 0;
            bs_freq_res[ch][0];                               1
            for (env = 1; env < bs_num_env[ch]; env++)
                bs_freq_res[ch][env] = bs_freq_res[ch][0];
            break;
        case LD-TRAN
            bs_transient_position                             4          uimsbf
            bs_num_env[ch] = Table_lookup(bs_transient_position)
            for (env = 0; env < bs_num_env[ch]; env++)
                bs_freq_res[ch][bs_num_env[ch] - 1 - env];    1
            break;
    }
    if (bs_num_env[ch] > 1)
        bs_num_noise[ch] = 2;
    else
        bs_num_noise[ch] = 1;
}
```

206 208 210 212 211 214 216 218 219 224 202

Note 1: bs_num_en may be limited to a specific value
Note 2: the division (/) is a floating point operation without rounding

FIGURE 3

| TRANSIENT POSITION | NUMBER OF ENVE-LOPES | LOCATION OF THE BOUNDARY BETWEEN THE FIRST TWO ENVELOPES | LOCATION OF THE BOUNDARY BETWEEN THE SECOND AND THIRD ENVELOPES | ENVELOPE HAVING THE TRANSIENT LOCATED THEREIN |
|---|---|---|---|---|
| 0 | 2 | 2 | - | 0 |
| 1 | 2 | 3 | - | 0 |
| 2 | 3 | 2 | 4 | 1 |
| 3 | 3 | 3 | 5 | 1 |
| 4 | 3 | 4 | 6 | 1 |
| 5 | 3 | 5 | 7 | 1 |
| 6 | 3 | 6 | 8 | 1 |
| 7 | 3 | 7 | 9 | 1 |
| 8 | 3 | 8 | 10 | 1 |
| 9 | 3 | 9 | 11 | 1 |
| 10 | 3 | 10 | 12 | 1 |
| 11 | 3 | 11 | 13 | 1 |
| 12 | 3 | 12 | 14 | 1 |
| 13 | 2 | 13 | - | 1 |
| 14 | 2 | 14 | - | 1 |
| 15 | 2 | 15 | - | 1 |

| TRANSIENT POSITION | NUMBER OF ENVELOPES | FIRST BOUNDARY | SECOND BOUNDARY | TRANSIENT INDEX | NO FIRST ENVELOPE | EXPANSION FACTOR |
|---|---|---|---|---|---|---|
| 0 | 2 | 2 | - | 0 | 0 | 0 |
| 1 | 3 | 1 | 4 | 0 | 1 | 0 |
| 2 | 3 | 2 | 5 | 1 | 1 | 0 |
| 3 | 3 | 3 | 6 | 1 | 1 | 0 |
| 4 | 3 | 4 | 7 | 1 | 1 | 0 |
| 5 | 3 | 5 | 8 | 1 | 1 | 0 |
| 6 | 3 | 6 | 9 | 1 | 0 | 0 |
| 7 | 3 | 7 | 10 | 1 | 0 | 0 |
| 8 | 3 | 8 | 11 | 1 | 0 | 0 |
| 9 | 3 | 9 | 12 | 1 | 0 | 0 |
| 10 | 3 | 10 | 13 | 1 | 0 | 0 |
| 11 | 3 | 11 | 14 | 1 | 0 | 0 |
| 12 | 2 | 12 | - | 1 | 0 | 0 |
| 13 | 2 | 13 | - | 1 | 0 | 0 |
| 14 | 2 | 14 | - | 1 | 0 | 2 |
| 15 | 2 | 15 | - | 1 | 0 | 3 |

```
Syntax                                                          No. of bits   Mnemonic
sbr_grid(ch)
{
    switch (bs_frame_class) {                                   2             uimsbf
        case FIXFIX
            bs num_env[ch] = 2^tmp:                             2             uimsbf

            if (bs_num_env[ch] == 1)
                bs_amp_res = 0;
            bs_freq_res[ch][0];                                 1
            for (env = 1; env < bs_num_env[ch]; env++)
                bs_freq_res(ch][env] = bs_freq._res[ch][0];
            break;
        case FIXVAR
            bs_var_bord 1[ch];                                  2             uimsbf
            bs_num_env[ch] = bs_num_rel_1[ch] + 1;              2             uimsbf
            for (rel = 0; rel < bs_num_env[ch]-1; rel++)
                bs_rel_bord_1 [ch][rel] = 2* tmp + 2;           2             uimsbf
                ptr_Bits = ceil (log (bs_num_env[ch] + 1) log (2));
            bs_pointer[ch];                                     ptr_bits      uimsbf
            for (env = 0; env < bs_num_env[ch]; env++)
                bs_freq_res[ch][bs_num_env[ch] - 1 - env];      1
            break:
        case VARFIX
            bs_var bord_0[ch];                                  2             uimsbf
            bs_num_env[ch] = bs_num_rel_0[ch] + 1;              2             uimsbf
            for (rel = 0; rel < bs_num_env[ch]-1; rel++)
                bs_rel_bord_0[ch][rel] = 2* tmp + 2;            2             uimsbf
            ptr_bits = ceil (log (bs_num_env[ch] + 1)/ log (2));
            bs_pointer[ch];                                     ptr_bits      uimsbf
            for (env = 0; env < bs_num_env[ch]; env++)
                bs_freq_res[ch] [env];                          1
            break;
        case VARVAR
            bs_var_bord_0[ch];                                  2             uimsbf
            bs_var_bord_1[ch];                                  2             uimsbf
            bs_num_rel_0[ch];                                   2             uimsbf
            bs_num_rel_1[ch];                                   2             uimsbf
            bs_num_env[ch] = bs_num_rel_0[ch1 + bs_num_rel_1[ch] + 1;                Note 1
            for (rel = 0; rel < bs_num_rel_0[ch]; rel++)
                bs_rel_bord_0[ch][rel] = 2*tmp + 2;             2             uimsbf
                for (rel = 0; rel < bs_num_rel_1 [ch]; rel++)
                bs_rel_bord_1 [ch][rel] = 2* tmp + 2;           2             uimsbf
            ptr_bits = ceil (log(bs num env[ch] + 1) / log (2));  Note 2
            bs_pointer[chl];                                    ptr_Bits      uimsbf
            for (env = 0; env < bs_num_env[ch]; env++)
                bs_freq_res[ch][env];                           1
            break;
    }

    if (bs_num_env[ch]>1)
      bs_num_noise[ch] 2;
      else
        bs_num_noise[ch] = 1:
}
```

FIGURE 12

ENCODING AN INFORMATION SIGNAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Notice: More than one reissue application has been filed for the reissue of U.S. Pat. No. 8,126,721, including pending subject reissue application Ser. No. 18/225,553, and reissue applications Ser. Nos. 18/225,488, 18/225,505, 18/225,527, 18/225,568, and 18/225,619.*

This application, *Ser. No. 18/225,553, filed Jul. 24, 2023, is a reissue of U.S. Pat. No. 8,126,721, which* claims priority from Provisional U.S. Patent Application No. 60/862,033, which was filed on Oct. 18, 2006, and is incorporated herein in its entirety by reference.

TECHNICAL FIELD

The present invention relates to information signal encoding such as audio encoding, and, in that context, in particular to SBR (spectral band replication) encoding.

BACKGROUND

In applications having a very small bit rate available, it is known, in the context of encoding audio signals, to use an SBR technique for encoding. Only the low-frequency portion is encoded fully, i.e. at an adequate temporal and spectral resolution. For the high-frequency portion, only the spectral envelope, or the envelope of the spectral temporal curve of the audio signal, is detected and encoded. On the decoder side, the low-frequency portion is retrieved from the encoded signal and is subsequently used to reconstruct, or "replicate", the high-frequency portion therefrom. However, to adapt the energy of the high-frequency portion, which has thus been preliminarily reconstructed, to the actual energy within the high-frequency portion of the original audio signal, the spectral envelope transmitted is used, on the decoder side, for spectral weighting of the high-frequency portion reconstructed preliminarily.

For the above effort to be worthwhile, it is important, of course, that the number of bits used for transmitting the spectral envelopes be as small as possible. It is therefore desirable for the temporal grid within which the spectral envelope is encoded to be as coarse as possible. On the other hand, however, too coarse a grid leads to audible artefacts, which is notable, in particular, with transients, i.e. at locations where the high-frequency portions will predominate rather than, as usual, the low-frequency portions, or where there is at least a rapid increase in the amplitude of the high-frequency portions. In audio signals, such transients correspond, for example, to the beginnings of a note, such as actuation of a piano string or the like. If the grid is too coarse over the time period of a transient, this may lead to audible artefacts in the decoder-side reconstruction of the entire audio signal. For, as one knows, on the decoder side, the high-frequency signal is reconstructed from the low-frequency portion in that, within the grid area, the spectral energy of the decoded low-frequency portion is normalized and then adapted to the spectral envelope transmitted by means of weighting. In other words, spectral weighting is simply performed within the grid area so as to reproduce the high-frequency portion from the low-frequency portion. However, if the grid area around the transient is too large, a lot of energy will be located, within this grid area, in addition to the energy of the transient, in the background and/or chord portion in the low-frequency portion which is used for reproducing the high-frequency portion. Said low-frequency portion is co-amplified by the weighting factor, even though this does not result in a good estimation of the high-frequency portion. Across the entire grid area, this will lead to an audible artefact which, in addition, will set in even before the actual transient. This problem may also be referred to as "pre-echo".

The problem could be solved when the grid area around the transient is fine enough so that the transient/background ratio of the part of the low-frequency portion within this grid area is improved. Small grid areas or small grid boundary distances, however, are obstacles on the way to the above-outlined desire for a low bit consumption for encoding the spectral envelopes.

In the ISO/IEC 14496-3 standard—simply referred to as "the standard" below—an SBR encoding is described in the context of the AAC encoder. The AAC encoder encodes the low-frequency portion in a frame-by-frame manner. For each such SBR frame, the above-specified time and frequency resolution is defined at which the spectral envelope of the high-frequency portion is encoded in this frame. To address the problem that transients may also fall on SBR frame boundaries, the standard allows that the temporal grid may temporarily be defined such that the grid boundaries do not necessarily coincide with the frame boundaries. Rather, in this standard, the encoder transmits, per frame, a syntax element bs_frame_class to the decoder, said syntax element indicating per frame whether the temporal grid of the spectral envelope gridding for the respective frame is defined precisely between the two frame boundaries or between boundaries which are offset from the frame boundaries, specifically at the front and/or at the back. Overall, there are four different classes of SBR frames, i.e. FIXFIX, FIXVAR, VARFIX and VARVAR. The syntax used by the encoder in the standard to define the grid per SBR frame is depicted in a pseudo code representation in FIG. 12. In particular, in the representation of FIG. 12, those syntax elements which are actually encoded and/or transmitted by the encoder are printed in bold type in FIG. 12, the number of the bits used for transmission and/or encoding being indicated in the second column from the right in the respective row. As may be seen, the syntax element bs_frame_class which has just been mentioned is initially transmitted for each SBR frame. As a function thereof, further syntax elements will follow which, as will be illustrated, define the temporal resolution and/or gridding. If, for example, the 2-bits syntax element bs_frame_class indicates that the SBR frame in question is a FIXFIX SBR frame, the syntax element tmp which defines the number of grid areas in this SBR frame, and/or which defines the number of envelopes, as $2^{tmp}$ will be transmitted as the second syntax element. The syntax element bs_amp_res, which is used for the quantization step size for encoding the spectral envelope in the current SBR frame, is automatically adjusted as a function of bs_num_env, and is not encoded or transmitted. Finally, for a FIXFIX frame, a bit is transmitted for determining the frequency resolution of the grid bs_freq_res. FIXFIX frames are defined precisely for one frame, i.e. the grid boundaries coincide with the frame boundaries as defined by the AAC encoder.

This is different for the other three classes. For FIXVAR, VARFIX and VARVAR frames, syntax elements bs_var_bord_1 and/or bs_bar_bod_0 are transmitted to indicate the number of time slots, i.e. the time units wherein the filter bank for spectral decomposition of the audio signal operates, by which are offset relative to the normal frame boundaries. As a function thereof, syntax elements bs_num_rel_1 and an associated tmp and/or bs_num_rel_0 and an associated tmp are also transmitted so as to define a number of grid areas, or envelopes, and the size thereof from the offset frame boundary. Finally, a syntax element bs_pointer is also transmitted within the variable SBR frames, said syntax element pointing to one of the defined envelopes and serving to define one or two noise envelopes for determining the noise portion within the frame as a function of the spectral envelope gridding, which, however, shall not be explained in detail below in order to simplify the representation. Finally, the respective frequency resolution is determined, namely by a respective one-bit syntax element bs_freq_res per envelope, for all grid areas and/or envelopes in the respective variable frames.

FIG. 13a represents, by way of example, a FIXFIX frame wherein the syntax element tmp is 1, so that the number of envelopes is bs_num_env $2^1=2$. In FIG. 13a it shall be assumed that the time axis extends from the left to the right in a horizontal manner. An SBR frame, i.e. one of the frames in which the AAC encoder encodes the low-frequency portion, is indicated by reference numerals 902 in FIG. 13a. As can be seen, the SBR frame 902 has a length of 16 QMF slots, the QMF slots being, as has been mentioned, the time slots in which units the analysis filter bank operates, the QMF slots being indicated by box 904 in FIG. 13a. In FIXFIX frames, the envelopes, or grid areas, 906a and 906b, i.e. two in number here, have the same length within the SBR frames 902, so that a time grid and/or envelope boundary 908 is defined precisely in the center of the SBR frame 902. In this manner the exemplary FIXFIX frame of FIG. 13a defines that a spectral distribution for the grid area, or the envelope, 906a, and a further one for envelope 906, is temporally determined from the spectral values of the analysis filter bank. The envelopes, or grid areas, 906a and 906b thus specify the grid in which the spectral envelope is encoded and/or transmitted.

By comparison, FIG. 13b shows a VARVAR frame. SBR frame 902 and associated QMF slots 904 are indicated again. For this SBR frame, however, syntax elements bs_var_bord_0 and/or bs_var_bord_1 have defined that the envelopes 906a', 906b' and 906c' associated therewith are not to start at the SBR frame start 902a and/or to end at the SBR frame end 902b. Rather, one may see from FIG. 13b that the previous SBR frame (not to be seen in FIG. 13b) has already been extended two QMF slots beyond the SBR frame start 902a of the current SBR frame, so that the last envelope 910 of the preceding SBR frame still extends into the current SBR frame 902. The last envelope 906c' of the current frame also extends beyond the SBR frame end of the current SBR frame 902, namely, by way of example, also by two QMF slots here. In addition, one can also see here, by way of example, that the syntax elements of the VARVAR frame bs_num_rel_0 and bs_num_rel_1 are adjusted to 1, respectively, with the additional information that the envelopes thus defined have a length of four QMF slots at the start and at the end of the SBR frame 902, i.e. 906a' and 906b' in accordance with tmp=1, so as to extend from the frame boundaries into the SBR frame 902 by this number of slots. The remaining space of the SBR frame 902 will then be occupied by the remaining envelope, in this case the third envelope 906b'.

By having T in one of the QMF slots 904, FIG. 13b indicates, by way of example, the reason why a VARVAR frame has been defined here, namely because the transient position T is located close to the SBR frame end 902b, and because there probably was a transient (not to be seen) also in the SBR frame preceding the current one.

The standardized version in accordance with ISO/ICE 14496-3 thus involves overlapping of two successive SBR frames. This enables setting the envelope boundaries in a variable manner, irrespective of the actual SBR frame boundaries in accordance with the waveform. Transients may thus be enveloped by envelopes of their own, and their energy may be cut off from the remaining signal. However, an overlap also involves an additional system delay, as was illustrated above. In particular, four frame classes are used for signaling in the standard. In the FIXFIX class, the boundaries of the SBR envelopes coincide with the boundaries of the core frame, as is shown in FIG. 13a. The FIXFIX class is used when no transient is present in this frame. The number of envelopes specifies their equidistant distribution within the frame. The FIXVAR class is provided when there is a transient in the current frame. Here, the respective set of envelopes thus starts at the SBR frame boundary and ends, in a variable manner, in the SBR transmission area. The VARFIX class is provided for the event that a transient is not located in the current, but in the previous frame. The sequence of envelopes from the last frame here is continued by a new set of envelopes which ends at the SBR frame boundary. The VARVAR class is provided for the case that a transient is present both in the last frame and in the current frame. Here, a variable sequence of envelopes is continued by a further variable sequence. As has been described above, the boundaries of the variable envelopes are transmitted in relation to one another.

Even though the number of QMF slots by which the boundaries may be offset relative to the fixed frame boundaries by means of the syntax elements bs_var_bord_0 and bs_var_bord_1, this possibility results in a delay on the decoder side due to the occurrence of envelopes which extend beyond SBR frame boundaries and thus necessitate the formation and/or averaging of spectral signal energies across SBR frame boundaries. However, this time delay is not tolerable in some applications, such as in applications in the field of telephony or other live applications which rely on the time delay caused by the encoding and decoding to be small. Even though the occurrence of pre-echoes is thus prevented, the solution is not suitable for applications necessitating a short delay time. In addition, the number of bits needed for transmitting the SBR frames in the above-described standard is relatively high.

SUMMARY

According to an embodiment, an encoder may have a low-frequency portion encoder for encoding a low-frequency portion of an information signal in units of frames of the information signal; a localizer for localizing transients within the information signal; an associator for, as a function of the localization, associating a respective reconstruction mode from among at least two possible reconstruction modes with the frames of the information signal, and, for frames which have associated therewith a first one of the at least two possible reconstruction modes, associating a respective transient position indication with these frames; and a generator for generating a representation of a spectral envelope of a high-frequency portion of the information signal in a temporal grid which depends on reconstruction modes associated with the frames, such that frames which have the first one of the at least two possible reconstruction modes associated therewith, the frame boundaries of these frames coincide with grid boundaries of the grid, and the grid boundaries of the grid within these frames depend on the transient position indication; and a combiner for combining the encoded low-frequency portion, the representation of the spectral envelope and information on the associated reconstruction modes and the transient position indications into an encoded information signal.

According to another embodiment, a decoder may have an extractor for extracting, from the encoded information signal, an encoded low-frequency portion of an information signal, a representation of a spectral envelope of a high-frequency portion of the information signal, information on reconstruction modes associated with frames of the information signal and corresponding with one, respectively, of at least two reconstruction modes, and transient position indications associated with frames, in each case, which have a first one of the at least two reconstruction modes associated with them; a low-frequency portion decoder for decoding the encoded low-frequency portion of the information signal in units of frames of the information signal; a provider for providing a preliminary high-frequency portion signal on the basis of the decoded low-frequency portion; and an adaptor for spectrally adapting the preliminary high-frequency portion signal to the spectral envelopes by means of spectral weighting of the preliminary high-frequency portion signal as a function of the representation of the spectral envelopes in a temporal grid which depends on the reconstruction modes associated with the frames, such that for frames having the first one of the at least two possible reconstruction modes associated with them, the frame boundaries of these frames coincide with grid boundaries of the grid, and the grid boundaries of the grid within these frames depend on the transient position indication.

According to another embodiment, an encoded information signal may have an encoded low-frequency portion of an information signal; a representation of a spectral envelope of a high-frequency portion of an information signal; and of information on reconstruction modes which are associated with frames of the information signal and each correspond to one of at least two reconstruction modes, and transient position indications each associated with frames which have a first one of the at least two reconstruction modes associated with them, such that the information signal may be obtained from the encoded information signal by: decoding the encoded low-frequency portion of the information signal in units of frames of the information signal; providing a preliminary high-frequency portion signal on the basis of the decoded low-frequency portion; and spectrally adapting the preliminary high-frequency portion signal to the spectral envelopes by spectrally weighting the preliminary high-frequency portion signal as a function of the representation of the spectral envelopes in a temporal grid which depends on the reconstruction modes associated with the frames, such that for frames which have the first one of the at least two possible reconstruction modes associated with them, the frame boundaries of these frames coincide with grid boundaries of the grid, and the grid boundaries of the grid within these frames depend on the transient position indication.

According to another embodiment, a method of encoding may have the steps of encoding a low-frequency portion of an information signal in units of frames of the information signal; localizing transients within the information signal; associating, as a function of the localization, a respective reconstruction mode from among at least two possible reconstruction modes with the frames of the information signal, and, for frames which have associated therewith a first one of the at least two possible reconstruction modes, associating a respective transient position indication with these frames; and generating a representation of a spectral envelope of a high-frequency portion of the information signal in a temporal grid which depends on the reconstruction modes associated with the frames, such that frames which have the first one of the at least two possible reconstruction modes associated therewith, the frame boundaries of these frames coincide with grid boundaries of the grid, and the grid boundaries of the grid within these frames depend on the transient position indication; and combining the encoded low-frequency portion, the representation of the spectral envelope and information on the associated reconstruction modes and the transient position indications into an encoded information signal.

According to another embodiment, a method of decoding may have the steps of extracting, from the encoded information signal, an encoded low-frequency portion of an information signal, a representation of a spectral envelope of a high-frequency portion of the information signal and information on reconstruction modes associated with frames of the information signal and corresponding with one, respectively, of at least two reconstruction modes, and transient position indications associated with frames, in each case, which have a first one of the at least two reconstruction modes associated with them; decoding the encoded low-frequency portion of the information signal in units of frames of the information signal; providing a preliminary high-frequency portion signal on the basis of the decoded low-frequency portion; and spectrally adapting the preliminary high-frequency portion signal to the spectral envelopes by means of spectral weighting of the preliminary high-frequency portion signal as a function of the representation of the spectral envelopes in a temporal grid which depends on the reconstruction modes associated with the frames, such that for frames having the first one of the at least two possible reconstruction modes associated with them, the frame boundaries of these frames coincide with grid boundaries of the grid, and the grid boundaries of the grid within these frames depend on the transient position indication.

A finding of the present invention is that the transient problem may be sufficiently addressed, and for this purpose, a further delay on the decoding side may be reduced, if a new SBR frame class is employed wherein the frame boundaries are not offset, i.e. the grid boundaries are still synchronized with the frame boundaries, but wherein a transient position indication is additionally used as a syntax element so as to be used, on the encoder and/or decoder sides, within the frames of this new frame class for determining the grid boundaries within these frames.

In accordance with one embodiment of the present invention, the transient position indication is used such that a relatively short grid area, referred to as transient envelope below, will be defined around the transient position, whereas only one envelope will extend, in the remaining part before and/or behind it, in the frame, from the transient envelope to the start and/or the end of the frame. The number of bits to be transmitted and/or to be encoded for the new class of frames is thus also very small. On the other hand, transients and/or pre-echo problems associated therewith may be sufficiently addressed. Variable SBR frames, such as FIXVAR, VARFIX and VARVAR, will then no longer be needed, so that delays for compensating envelopes which extend beyond SBR frame boundaries will no longer be necessary. In accordance with an embodiment of the present invention, only two frame classes thus will now be admissible, namely a FIXFIX class and this class which has just been described and which will be referred to as LD_TRAN class below.

In accordance with a further embodiment of the present invention, it is not the case that one or several spectral envelopes and/or spectral energy values are transmitted and/or inserted into the encoded information signal for each grid area within the frames of the LD_TRAN class. Specifically, this is not even done when the transient envelope specified in its position within the frame by the transient position indication is located close to the frame boundary which is leading in terms of time, so that the envelope of this LD_TRAN frame, said envelope being located between the frame boundary which is leading in terms of time and the transient envelope, will extend only over a short time period, which is not justified from the point of view of encoding efficiency, since, as one knows, the brevity of this envelope is not due to a transient, but rather to the accidental temporal proximity of the frame boundary and the transient. In accordance with this alternative embodiment, the spectral energy value(s) and the respective frequency resolution of the previous envelope are taken over, therefore, for this envelope concerned, just like the noise portion, for example. Thus, transmission may be omitted, which is why the compression rate is increased. Conversely, losses in terms of audibility are only small, since there is not transient problem at this point. In addition, no delay will occur on the decoder side, since utilization for high-frequency reconstruction is directly possible for all envelopes involved, i.e. envelopes from a previous frame, transient envelope and intervening envelope.

In accordance with a further embodiment, the problems of an unintentionally large amount of data in the occurrence of a transient at the end of an LD_TRAN frame are addressed in that an agreement is reached between the encoder and the decoder as to how far the transient envelope which is located at the trailing frame boundary of the current LD_TRAN frame is to virtually project into the subsequent frame. The decision is made, for example, by means of accessing the tables in the encoder and the decoder alike. In accordance with the agreement, the first envelope of the subsequent frame, such as the single envelope of a FIXFIX frame, is shortened so as to begin only at the end of the virtual extended envelope. The encoder calculates the spectral energy value(s) for the virtual envelope over the entire time period of this virtual envelope, but transmits the result, as it seems, only for the transient envelope, possibly in a manner which is reduced as a function of the ratio of the temporal portion of the virtual envelope in the leading and trailing frames. On the decoder side, the spectral energy value(s) of the transient envelope located at the end are used both for high-frequency reconstruction in this transient envelope and, separate therefrom, for high-frequency reconstruction in the initial extension area in the subsequent frames, in that one and/or several spectral energy value(s) for this area are derived from that, or those, of the transient envelope. "Oversampling" of transients located at frame boundaries is thereby avoided.

In accordance with a further aspect of the present invention, a finding of the present invention is that the transient problems described in the introduction to the description may be sufficiently addressed, and a delay on the decoder side may be reduced, if an envelope and/or grid area division is indeed used, according to which envelopes may indeed extend across frame boundaries so as to overlap with two adjacent frames, but if these envelopes are again subdivided by the decoder at the frame boundary, and the high-frequency reconstruction is performed at the grid which is subdivided in this manner and coincides with the frame boundaries. For the partial grid areas, thus obtained, of the overlap grid areas a spectral energy value, or a plurality of spectral energy values, is/are obtained, respectively, on the decoder side, from the one or the plurality of spectral energy value(s) as have been transmitted for the envelope extending across the frame boundary.

In accordance with a further aspect of the present invention, a finding of the present invention is that a delay on the decoding side may be obtained by reducing the frame size and/or the number of the samples contained therein, and that the effect of the increased bit rate associated therewith may be reduced if a new flag is introduced, and/or a transient absence indication is introduced, for frames having reconstruction modes according to which the grid boundaries coincide with the frame boundaries of these frames, such as FIXFIX frames, and/or for the respective reconstruction mode. Specifically, if there is no transient present in such a shorter frame, and if no other transient is present in the vicinity of the frame, so that the information signal is stationary at this point, the transient absence indication may be used not to introduce, for the first grid area of such a frame, any value describing the spectral envelope into the encoded information signal, but to derive, or obtain, same on the decoder side, rather from the value(s) representing the spectral envelope, said values being provided in the encoded information signal for the last grid area and/or the last envelope of the temporally preceding frame. In this manner, shortening of the frames with a reduced effect on the bit rate is possible, which shortening enables shorter delay time, on the one hand, and enables the transient problems because of the smaller frame units, on the other hand.

BRIEF DESCRIPTION OF THE DRAWINGS

Embodiments of the present invention will be detailed subsequently referring to the appended drawings, in which:

FIG. 2 shows a pseudo code for describing the syntax of the syntax elements used by the encoder of FIG. 1 for defining the SBR frame grid division;

FIG. 3 shows a table which may be defined, on the encoder and decoder sides, to obtain, from the syntax element bs_transient_position in FIG. 2, the information on the number of envelopes and/or grid areas and the positions of the grid area boundaries within an LD_TRAN frame;

FIG. 7a is a schematic representation for illustrating an envelope encoding in accordance with an embodiment for overcoming the problems of FIG. 6a;

FIG. 7a is a schematic representation for illustrating an envelope encoding in accordance with an embodiment for overcoming the problems of FIG. 6b;

FIG. 12 shows a pseudo code of the syntax for SBR frame envelope division in accordance with the ISO/IEC 14496-3 standard.

DETAILED DESCRIPTION

Figure 1:
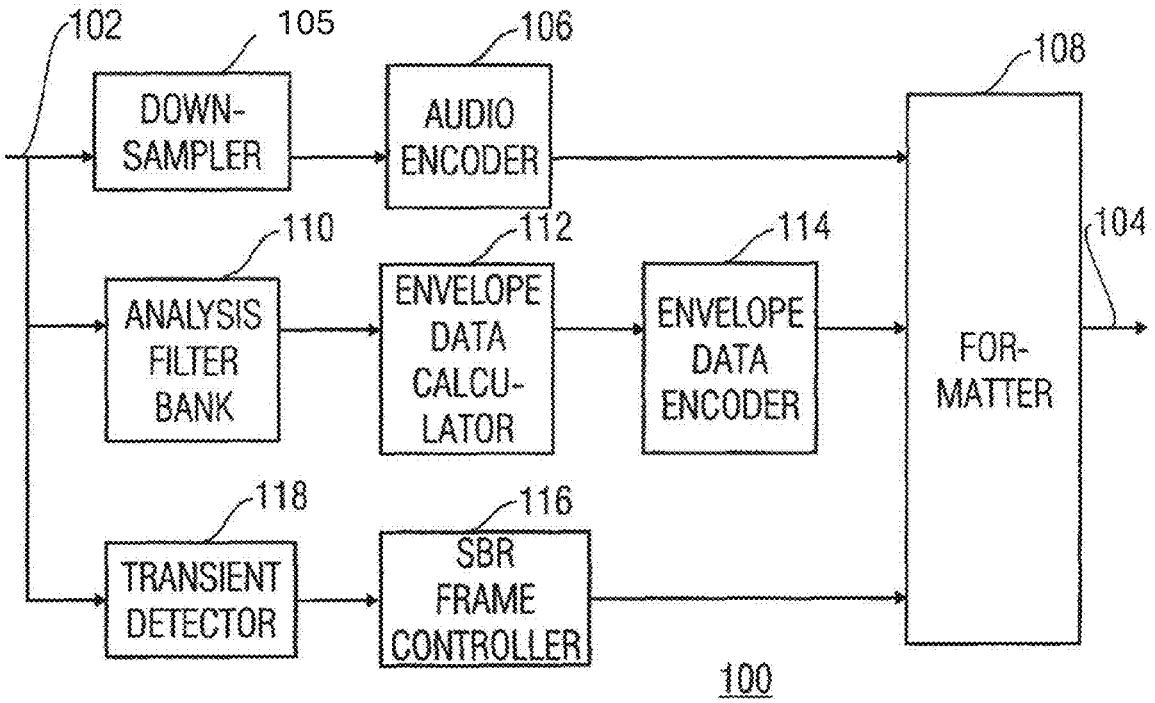
FIG. 1 is a block diagram of an encoder in accordance with an embodiment of the present invention.

FIG. 1 shows the architecture of an encoder in accordance with an embodiment of the present invention. The encoder of FIG. 1 is, by way of example, an audio encoder generally indicated by reference numeral 100. It includes an input 102 for the audio signal to be encoded, and an output 104 for the encoded audio signal. It shall be assumed below that the audio signal in input 102 is a sampled audio signal, such as a PCM-encoded signal. However, the encoder of FIG. 1 may also be implemented differently. The encoder of FIG. 1 further includes a down-sampler [104] *105* and an audio encoder 106 which are connected, in the order mentioned, between the input 102 and a first input of a formatter 108, the output of which, in turn, is connected to the output 104 of the encoder 100. Due to the connection of the portions [104] *105* and 106, an encoding of the down-sampled audio signal 102 results at the output of the audio encoder 106, said encoding, in turn, corresponding to an encoding of the low-frequency portion of the audio signal 102. The audio encoder 106 is an encoder which operates in a frame-by-frame manner in the sense that the encoder result present at the output of the audio encoder 106 can only be decoded in units of these frames. By way of example, it shall be assumed below that the audio encoder 106 is an encoder in conformity with AAC-LD in accordance with the standard of ISO/IEC 14496-3.

An analysis filter bank 110, an envelope data calculator 112 as well as an envelope data encoder 114 are connected, in the order mentioned, between the input 102 and a further input of the formatter 108. In addition, the encoder 100 includes an SBR frame controller 116 which has a transient detector 118 connected between its input and the input 102. Outputs of the SBR frame controller 116 are connected both to an input of the envelope data calculator 112 and to a further input of the formatter 108.

Now that the architecture of the encoder of FIG. 1 has been described above, its mode of operation will be described below. As has already been mentioned, an encoded version of the low-frequency portion of the audio signal 102 arrives at the first input of formatter 108 in that the audio encoder 106 encodes the down-sampled version of the audio signal 102, wherein, e.g., only every other sample of the original audio signal is forwarded. The analysis filter bank 110 generates a spectral decomposition of the audio signal 102 with a certain temporal resolution. It shall be assumed, by way of example, that the analysis filter bank 110 is a QMF filter bank (QMF=quadrature mirror filter). The analysis filter bank 110 generates M subband values per QMF time slot, the QMF time slots each including 64 audio samples, for example. To reduce the data rate, the envelope data calculator 112 forms, from the spectral information of the analysis filter bank 110 which has high temporal and spectral resolutions, a representation of the spectral envelope of audio signal 102 with a suitably lower resolution, i.e. within a suitable time and frequency grid. In this context, the time and frequency grid is set by the SBR frame controller 116 per frame, i.e. per frame of the frames as are defined by the audio encoder 106. Again, the SBR frame controller 116 performs this control as a function of detected and/or localized transients as are detected and/or localized by the transient detector 118. For detection transients and/or note commencement times, the transient detector 118 performs a suitable statistical analysis of the audio signal 102. The analysis may be performed in the time domain or in the spectral domain. The transient detector 118 may evaluate, for example, the temporal envelope curve of the audio signal, such as the evaluation of the increase in the temporal envelope curve. As will be described in more detail below, the SBR frame controller 116 associates each frame and/or SBR frame to one of two possible SBR frame classes, namely either to the FIXFIX class or to the LD_TRAN class. In particular, the SBR frame controller 116 associates the FIXFIX class with each frame which contains no transient, whereas the frame controller associates the LD_TRAN class with each frame having a transient located therein. The envelope data calculator 112 sets the temporal grid in accordance with the SBR frame classes as have been associated with the frames by the SBR frame controller 116. Irrespective of the precise association, all frame boundaries will coincide with grid boundaries. Only the grid boundaries within the frames are influenced by the class association. As will be explained below in more detail, the SBR frame controller sets further syntax elements as a function of the frame class associated, and outputs these to the formatter 108. Even though not explicitly depicted in FIG. 1, the syntax elements may naturally also be subjected to an encoding operation.

Thus, the envelope data calculator 112 outputs a representation of the spectral envelopes in a resolution which corresponds to the temporal and spectral grid predefined by the SBR frame controller 116, namely by one spectral value per grid area. These spectral values are encoded by the envelope data encoder 114 and forwarded to the formatter 108. The envelope data encoder 114 may possibly also be omitted. The formatter 108 combines the information received into the encoded audio data stream 104 and/or to the encoded audio signal, and outputs same at the output 104.

The mode of operation of the encoder of FIG. 1 will be described in a little more detail below using FIGS. 2 to 4b with regard to temporal grid division which is set by the SBR frame controller 116 and used by the envelope data calculator 112 to determine, from the analysis filter bank output signal, the signal envelope in the predefined grid division.

FIG. 2 initially shows, by means of a pseudo code, the syntax elements by means of which the SBR frame controller 116 predefines the grid division which is to be used by the envelope data calculator 112. Just like in the case of FIG. 12, those syntax elements which are actually forwarded from the SBR frame controller 116 to the formatter 108 for encoding and/or for transmission are depicted in bold print in FIG. 2, the respective row in the column 202 indicating the number of bits used for representing the respective syntax element. As may be seen, a determination is initially made, by the syntax element bs_frame_class, for the SBR frame, whether the SBR frame is a FIXFIX frame or an LD_TRAN frame. Depending on the determination (204), different syntax elements are then transmitted. In the case of the FIXFIX class (206), the syntax element bs_num_env[ch] of the current SBR frame ch is initially set to $2^{tmp}$ by the 2-bit syntax element tmp (208). Depending on the number bs_num_env[ch] the syntax element bs_amp_res is left at a value of 1 which has been preset by default, or is set to zero (210), the syntax element bs_amp_res indicating the quantization accuracy with which the spectrally enveloping values which are obtained by the calculator 112 in the predefined gridding are forwarded to the formatter 108 in a state in which they are encoded by the encoder 114. The grid areas and/or envelopes predefined in their numbers by bs_num_env[ch] are set—with regard to their frequency resolution, which is to be used in same by the envelope data calculator 112 to determine the spectral envelope within them—by a common (211) syntax element bs_freq_res[ch] which is forwarded (212) to the formatter 108 with a bit from the SBR frame controller 116.

Figure 13A:
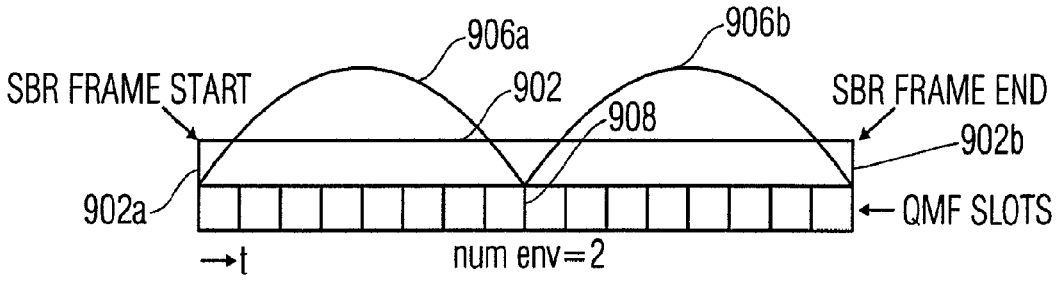
FIGS. 13a and 13b are schematic representations of a FIXFIX and/or VARVAR frame.
Figure 13B:
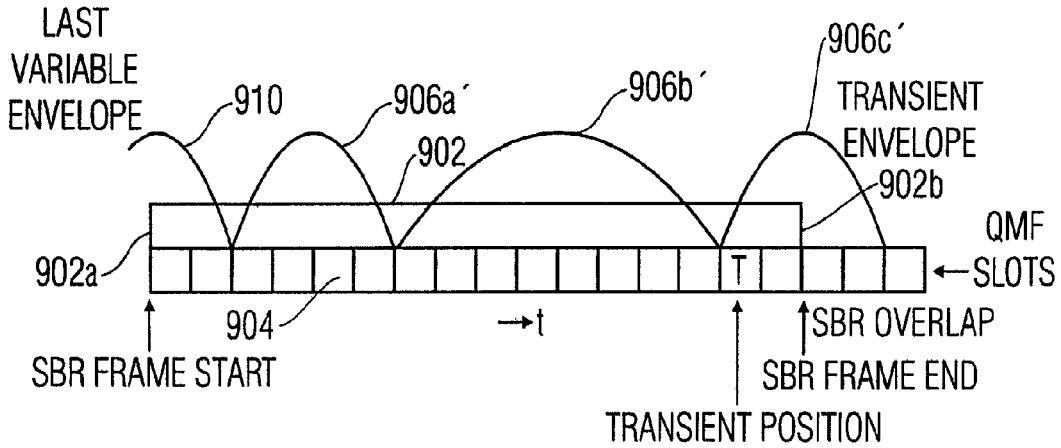

The mode of operation of the envelope data calculator 112 is to be described again below with reference to FIG. 13a when the SBR frame controller 116 specifies that the current SBR frame 902 is a FIXFIXFIX frame. In this case, the envelope data calculator 112 equally subdivides the current frame 902, which consists—here by way of example—of N=16 analysis filter bank time slots 904, into grid areas and/or envelopes 906a and 906b, so that here both grid areas and/or both envelopes 906a, 906b have a length of N/bs_num_inv[ch] time slots 904 and take up as many time slots between the SBR frame boundaries 902a and 902b. In other words, with FIXFIX frames, the envelope data calculator 112 arranges the grid boundaries 908 uniformly between the SBR frame boundaries 902a, 902b such that they are equidistantly distributed within these SBR frames. As has already been mentioned, the analysis filter bank 110 outputs subband spectral values per time slot 904. The envelope data calculator 112 temporally combines the subband values in an envelope-by-envelope manner and adds their square sums in order to obtain the subband energies in an envelope resolution. Depending on the syntax element bs_freq_res[ch], the envelope data calculator 112 also combines, in a spectral direction, several subbands to reduce the frequency resolution. In this manner, the envelope data calculator 112 outputs, per envelope 906a, 906b, a spectrally enveloping energy sampling at a frequency resolution which depends on bs_freq_res[ch]. These values are then encoded by the encoder 114 with a quantization which in turn depends on bs_amp_res.

Figure 4A:
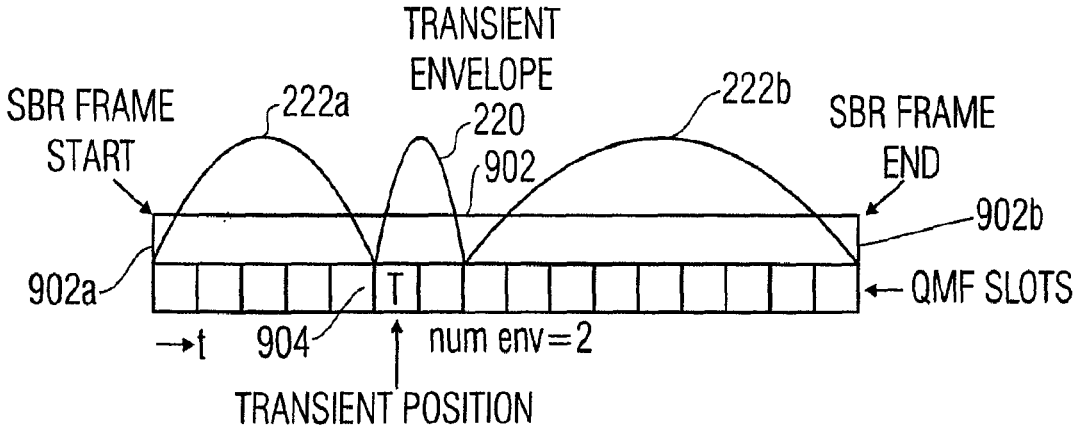
FIG. 4a is a schematic representation for illustrating an LD_TRAN frame.

So far, the preceding description related to the case where the SBR frame controller 116 associated a specific frame with the FIXFIX class, which is the case if there are no transients in this frame, as was described above. The following description, however, relates to the other class, i.e. the LDN-TRAN class, which is associated with a frame if it has a transient located in it, as is indicated by the detector 118. Thus, if the syntax element bs_frame_class indicates that this frame is an LDN-TRAN frame (214), the SBR frame controller 116 will determine and transmit, with four bits, a syntax element bs_transient_position so as to indicate—in units of the time slots 904, for example relative to the frame start 902a or, alternatively, relative to the frame end 902b—the position of the transient as has been localized by the transient detector 118 (216). At present, four bits are sufficient for this purpose. An exemplary case is depicted in FIG. 4a. FIG. 4a, in turn, shows the SBR frame 902 including the 16 time slots 904. The sixth time slot 904 from the SBR frame start 902a has a transient T located therein, which would correspond to bs_transient_position=5 (the first time slot is the time slot zero). As is indicated at 218 in FIG. 2, the subsequent syntax for setting the grid of an LD_TRAN frame is dependent on bs_transient_position, which must be taken into account, on the decoder side, in the parsing performed by a respective demultiplexer. However, at 218, the mode of operation of the envelope data calculator 112 upon obtaining the syntax element bs_transient_Position from the SBR frame controller 116 may be illustrated, which is as follows. By means of the transient position indication, the calculator 112 looks up bs_transient_position in a table, an example of which is shown in FIG. 3. As will be explained in more detail below with reference to the table of FIG. 3, the calculator 112 will set, by means of the table, an envelope subdivision within the SBR frame in such a manner that a short transient envelope is arranged around transient position T, whereas one or two envelopes 222a and 222b occupy the remaining part of the SBR frame 902, namely the part from the transient envelope 220 to the SBR frame start 902a, and/or the part from the transient envelope 220 to the SBR frame end 902b.

The table shown in FIG. 3 and used by the calculator 112 now includes five columns. The possible transient positions which, in the present example, extend from zero to 15 have been entered into the first column. The second column indicates the number of envelopes and/or grid areas 220, 222a and/or 222b which result at the respective transient position. As may be seen, the possible numbers are 2 or 3, depending on whether the transient position is located close to the SBR frame start or the SBR frame end 902a, 902b, only two envelopes being present in the latter case. The third column indicates the position of the first envelope boundary within the frame, i.e. the boundary of the first two adjacent envelopes in units of time slots 904, specifically the position of the start of the second envelope, the position=zero indicating the first time slot in the SBR frame. The fourth column accordingly indicates the position of the second envelope boundary, i.e. the boundary between the second and third envelopes, this indication naturally being defined only for those transient positions for which three envelopes are provided. Otherwise, the values entered are negligible in this column, which is indicated by "–" in FIG. 3. As may be seen by way of example in the table of FIG. 3, there is, for example, only the transient envelope 220 and the subsequent envelope 222b in the event that the transient position T is located in one of the first two time slots 904 from the SBR frame start 902a. It is not until the transient position is located in the third time slot from the SBR frame start 902a that there are three envelopes 222a, 220, 222b, envelope 222a including the first two time slots, transient envelope

220 including the third and fourth time slots, and envelope 222b including the remaining time slots, i.e. from the fifth one onwards. The last column in the table of FIG. 3 indicates, for each transient position possibility, which of the two or three envelopes corresponds to that which has the transient and/or the transient position located therein, this information obviously being redundant and thus not necessarily having to be set forth in a table. However, the information in the last column serves to specify—in a manner which will be described in more detail below—the boundary between two noise envelopes, within which the calculator 112 determines a value which indicates the magnitude of the noisy portion within these noise envelopes. The manner in which the boundary between these noise envelopes and/or grid areas is determined by the calculator 112 is known on the decoder side, and is performed in the same manner on the decoder side, just like the table of FIG. 3 is also present on the decoder side, namely for parsing and for grid division.

[Referring back to FIG. 2, the calculator 112 may thus determine the number of envelopes and/or grid areas in the LD_TRAN frames from Table 2 of FIG. 3, the SBR frame controller (116) indicating, for each one of these two or three envelopes, the frequency resolution by a respective 1-bit syntax element bs_freq_res[ch] per envelope (220). The controller 116 also transmits the syntax values bs_freq_res [ch], which set the frequency resolution, to the formatter 108 (220).]

[Thus, the calculator 112 calculates, for all LD_TRAN frames, spectral envelope energy values as temporal means over the duration of the individual envelopes 222a, 220, 222b, the calculator combining, in the frequency resolution, different numbers of subbands as a function of bs_freq_res of the respective envelope.]

*Referring back to FIG. 2, the calculator 112 may thus determine the number of envelopes and/or grid areas in the LD TRAN frames from Table 2 of FIG. 3, the SBR frame controller (116) indicating, for each one of these two or three envelopes, the frequency resolution by a respective 1-bit syntax element bs freq res per envelope (219). The controller 116 also transmits the syntax values bs freq res, which set the frequency resolution, to the formatter 108.*

*Thus, the calculator 112 calculates, for all LD TRAN frames, spectral envelope energy values as temporal means over the duration of the individual envelopes 222a, 220, 222b, the calculator combining, in the frequency resolution, different numbers of subbands as a function of bs freq res of the respective envelope.*

The above description mainly dealt with the mode of operation of the encoder with regard to calculating the signal energies for representing the spectral envelopes in the time/frequency grid as is specified by the SBR frame controller. Additionally, however, the encoder of FIG. 1 also transmits, for each grid area of a noise grid, a noise value which indicates, for this temporal noise grid area, the magnitude of the noisy portion in the high-frequency portion of the audio signal. Using these noise values, an even better reproduction of the high-frequency portion from the decoded low-frequency portion may be performed on the decoder side, as will be described below. As may be seen from FIG. 2, the number bs_num_noise of the noise envelopes for LD_TRAN frames is two, whereas the number for FIXFIX frames with bs_num_env=1 may also be one.

The subdivision of the LD_TRANS SBR frames into the two noise envelopes, but also of the FIXFIX frames into the one or two noise envelopes, may be performed, for example, in the same manner as is described in chapter 4.6.18.3.3 in the above-mentioned standard, to which reference shall be made in this context, and which passage shall be included, in this respect, by reference in the description of the present application. In particular, for example, the boundary between the two noise envelopes is positioned, by the envelope data calculator 112 for LD_TRAN frames, onto the same boundary as—if the envelope 220a exists—the envelope boundary between the envelope 220a and the transient envelope 220 and as—if the envelope 222 does not exist—the envelope boundary between the transient envelope 220 and the envelope 222b.

Figure 4B:
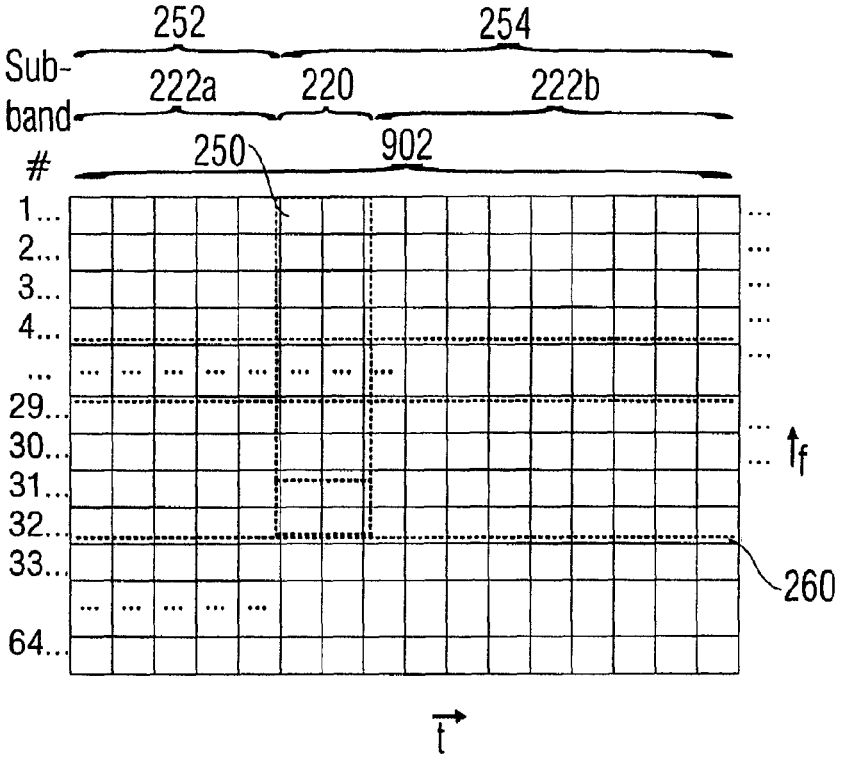
FIG. 4b is a schematic representation for illustrating the interplay of the analysis filter bank and the envelope data calculator in FIG. 1.

Before continuing with the description of a decoder which is able to decode the encoded audio signal at output 104 of encoder 100 of FIG. 1, the interplay between the analysis filter bank 110 and the envelope data calculator 112 shall be dealt with in more detail. By the box 250, FIG. 4b depicts, by way of example, the individual subband values which are output by the analysis filter bank 110. In FIG. 4b it is assumed that the time axis t again extends from the left to the right in a horizontal manner. A column of boxes in a vertical direction thus corresponds to the subband values as obtained by the analysis filter bank 110 at a certain time slot, an axis f being intended to indicate that the frequency is to increase in the upward direction. FIG. 4b shows, by way of example, 16 successive time slots belonging to an SBR frame 902. It is assumed, in FIG. 4b, that the present frame is an LD_TRAN frame and that the transient position is the same as was indicated, by way of example, in FIG. 4. The resulting grid classification within the frame 902 and/or the resulting envelopes are also illustrated in FIG. 4b. FIG. 4b also indicates the noise envelopes, specifically by 252 and 254. Using the formation of the sum of squares, the envelope data calculator 112 now determines mean signal energies in the temporal and spectral grid, as is depicted in FIG. 4b by the dashed lines 260. In the embodiment of FIG. 4b, the envelope data calculator 112 thus determines, for the envelope 222a and the envelope 222b, only half as many spectral energy values for representing the spectral envelope as for the transient envelope 220. However, as may also be seen, the spectral energy values for the representation of the spectral envelopes are formed only by means of the subband values 250 located in the higher-frequency subbands 1 to 32, whereas the low-frequency subbands 33 to 64 are ignored, since the low-frequency portion is encoded, as is known, by the audio encoder 106. In this context, it shall be noted, as a precaution, that the number of the subbands here is only by way of example, of course, as is the bundling of the subbands within the individual envelopes to form groups of four or two, respectively, as is indicated in FIG. 4b. To remain with the example of FIG. 4b, a total of 32 spectral energy values are calculated by the envelope data calculator 112 in the example of FIG. 4b for representing the spectral envelopes, the quantization accuracy of which is performed for encoding, again as a function of bs_amp_res, as was described above. In addition, the envelope data calculator 112 determines a noise value for the noise envelopes 252 and 254, respectively, on the basis of the subband values of the subbands 1 to 32 within the respective envelope 252 or 254, respectively.

Now that the encoder has been described above, the following will provide a description of a decoder in accordance with an embodiment of the present invention which is suited to decode the encoded audio signal at the output 103, said description below also addressing the advantages entailed by the LD_TRAN class described with regard to bit rate and delay.

Figure 5:
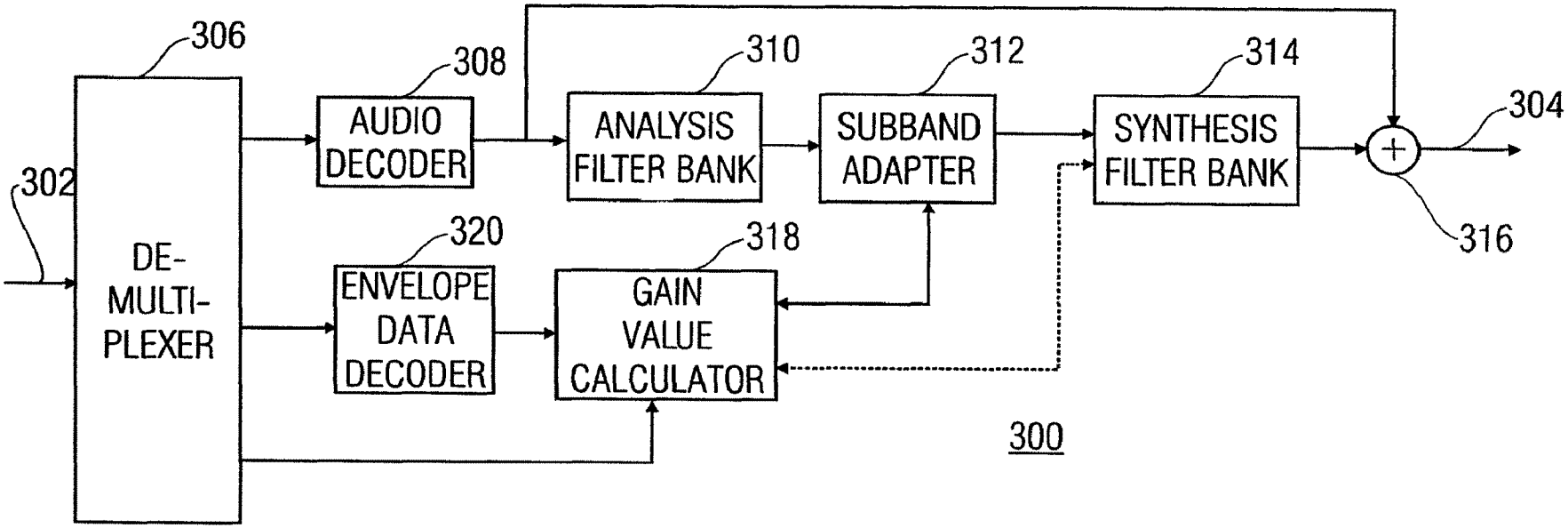
FIG. 5 is a block diagram of a decoder in accordance with an embodiment of the present invention.

The decoder of FIG. 5, which is generally indicated at 300, comprises a data input 302 for receiving the encoded audio signal, and an output 304 for outputting a decoded audio signal. The input of a demultiplexer 306, which possesses three outputs, is adjacent to the input 302. An audio decoder 308, an analysis filter bank 310, a subband adapter 312, a synthesis filter bank 314 as well as an adder 316 are connected, in the order mentioned, between a first one of these outputs and the output 304. The output of the audio decoder 308 is also connected to a further input of the adder 316. As will be described below, a connection of the output of the analysis filter bank 310 to a further input of the synthesis filter bank 314 may be provided instead of the adder 316 with its additional input. The output of the analysis filter bank 310, however, is also connected to an input of a gain value calculator 318, the output of which is connected to a further input of the subband adapter 312, and which also comprises second and third inputs, the second of which is connected to a further output of the demultiplexer, and the third input of which is connected, via an envelope data decoder 320, to the third output of the multiplexer 306.

The mode of operation of the decoder 300 is as follows. The demultiplexer 306 splits up the arriving encoded audio signal at the input 302 by means of parsing. Specifically, the demultiplexer 306 outputs the encoded signal relating to the low-frequency portion, as has been generated by the audio encoder 106, to the audio decoder 308 configured such that it is able to obtain, from the information obtained, a decoded version of the low-frequency portion of the audio signal and to output it at its output. The decoder 300 thus already has knowledge of the low-frequency portion of the audio signal to be decoded. However, the decoder 300 does not obtain any direct information on the high-frequency portion. Rather, the output signal of the decoder 308 also serves, at the same time, as a preliminary high-frequency portion signal or at least as a master, or basis, for the reproduction of the high-frequency portion of the audio signal in the decoder 300. Portions 310, 312, 314, 318, and 320 from the decoder 300 serve to utilize this master to reproduce, or to reconstruct, the final high-frequency portion therefrom, this high-frequency portion thus reconstructed being combined, by the adder 316, again with the decoded low-frequency portion so to eventually obtain the decoded audio signal 304. In this context it shall be noted, for completeness, sake, that the decoded low-frequency signal from the decoder 308 could also be subject to further preparatory treatments before it is input into the analysis filter bank 310, this not being shown, however, in FIG. 5.

In the analysis filter bank 310, the decoded low-frequency signal is again subject to a spectral dispersion with a fixed time resolution and a frequency resolution which essentially corresponds to that of the analysis filter bank of the encoder 110. Remaining with the example of FIG. 4b, the analysis filter bank 310 would output 32 subband values per time slot, for example, said subband values corresponding to the 32 low-frequency subbands (33-64 in FIG. 4b). It is possible that the subband values as are output by analysis filter bank 310 are reinterpreted, as early as at the output of this filter bank, or before the input of the subband adapter 312, as the subband values of the high-frequency portion, i.e. are copied into the high-frequency portion, as it were. However, it is also possible that in the subband adapter 312, the low-frequency subband values obtained from the analysis filter bank 310 initially have high-frequency subband values added to them in that all or some of the low-frequency subband values are copied into the higher-frequency portion, such as the subband values of subbands 33 to 64, as are obtained from the analysis filter bank 310, into subbands 1 to 32.

In order to perform the adaptation to the spectral envelope as has been encoded, on the encoder side, into the encoded audio signal 104, the demultiplexer 306 will initially forward that part of the encoded audio signal 302 which relates to the encoding of the representation of the spectral envelope, as has been generated by the encoder 114 on the encoder side, to the envelope data decoder 320, which, in turn, will forward the decoded representation of this spectral envelope to the gain values calculator 318. In addition, the demultiplexer 306 outputs that part of the encoded audio signal which relates to the syntax elements for grid division, as have been introduced into the encoded audio signal by the SBR frame controller 116, to the gain values calculator 318. The gain values calculator 318 now associates the syntax elements of FIG. 2 with the frames of the audio decoder 308 in a manner which is as synchronized as that of the SBR frame controller 116 on the encoder side. For the exemplary frame contemplated in FIG. 4b, for example, the gain values calculator 318 obtains, for each time/frequency domain of the dashed grid 260, an energy value from the envelope data decoder 320, which energy values together represent the spectral envelope.

In the same grid 260, the gain values calculator 318 also calculates the energy in the preliminarily reproduced high-frequency portion so as to be able to normalize the reproduced high-frequency portion in this grid and to weight it with the respective energy values it has obtained from the envelope data decoder 320, whereby the preliminarily reproduced high-frequency portion is spectrally adjusted to the spectral envelope of the original audio signal. Here, the gain values calculator takes into account the noise values which also have been obtained from the envelope data decoder 320 per noise envelope, so as to correct the weighting values for the individual subband values within this noise frame. Thus, what is forwarded at the output of the subband adapter 312 are subbands comprising subband values which are adapted with corrected weighting values to the spectral envelope of the original signal in the high-frequency portion. The synthesis filter bank 314 puts together the high-frequency portion thus reproduced in the time domain using these spectral values, whereupon the adder 316 combines this high-frequency portion with the low-frequency portion from the audio decoder 308 into the final decoded audio signal at the output 304. As is indicated by the dashed line in FIG. 5, it is also possible, alternatively, for the synthesis filter bank 314 to use, for synthesis, not only the high-frequency subbands as have been adapted by subband adapter 312, but to also use the low-frequency subbands as directly correspond to the output of the analysis filter bank 310. In this manner, the result of the synthesis filter bank 314 would directly correspond to the decoded output signal which could then be output at the output 304.

The above embodiments had in common that the SBR frames comprised an overlap region. In other words, the time division of the envelopes was adapted to the time division of the frames, so that no envelope overlaps two adjacent frames, for which purpose a respective signaling of the envelope time grid was conducted, specifically by means of LD_TRAN and FIXFIX classes. However, problems will arise if transients occur at the edges of the blocks or frames. In this case, a disproportionately large number of envelopes is needed to encode the spectral data including the spectral energy values, or the spectral envelope values, and the frequency resolution values. In other words, more bits are consumed than would be needed by the location of the transients. In principle, two such "unfavorable" cases may be distinguished, which are illustrated in FIGS. 6a and 6b.

Figure 6A:
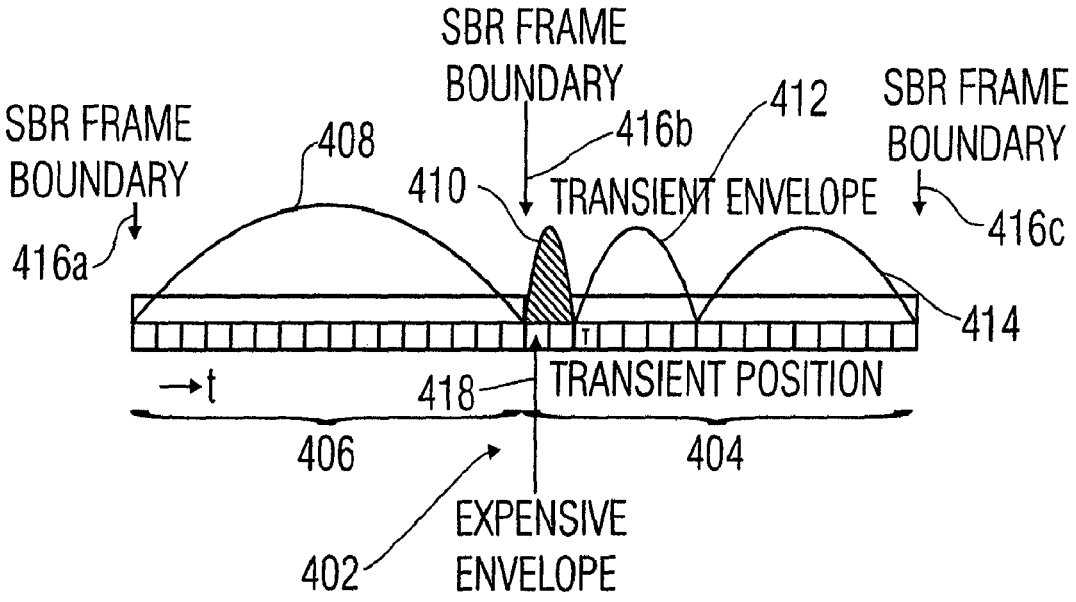
FIG. 6a is a schematic representation for illustrating an LD_TRAN frame with a transient envelope located far toward the leading end for illustrating the problems arising in this case.
Figure 6B:
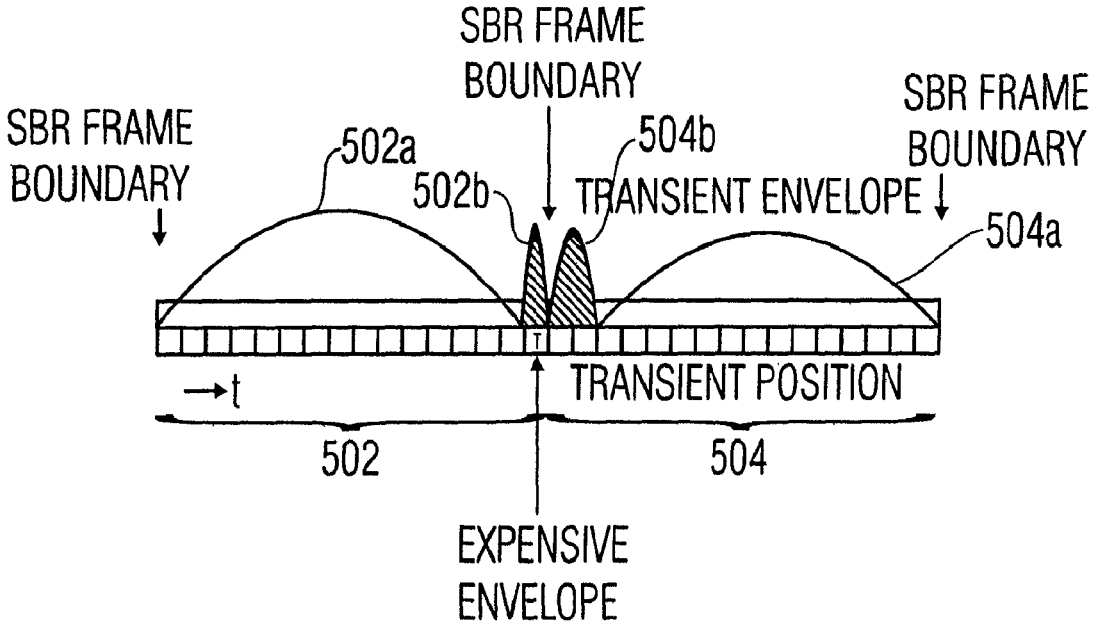
FIG. 6b is a schematic representation for illustrating a case wherein a transient is located between two frames, for illustrating the respective problems with regard to the high encoding expenditure in this case.

The first unfavorable situation will occur when the transient, which is established by the transient detector 118, is located almost at a frame start of a frame 404, as is illustrated in FIG. 6a. FIG. 6a shows an exemplary case wherein a frame 406 of the FIXFIX class, which comprises a single envelope 408 which extends over all 16 QMF slots, precedes the frame 404, at the start of which a transient has been detected by the transient detector 118, which is why the frame 404 has been associated, by the SBR frame controller 116, with an LD_TRAN class, with a transient position pointing to the third QMF slot of the frame 404, so that the frame 404 is subdivided into three envelopes 410, 412, and 414, of which envelope 412 represents the transient envelope, and the other envelopes 410 and 414 surround same and extend to the frame boundaries 416b and 416c of the respective frame 404. Merely to avoid confusion, it shall be pointed out that FIG. 6a is based on the assumption that a different table than in FIG. 3 has been used.

As is now indicated by the arrow 418 which points to the first envelope 410 in the LD_TRAN frame 404, the transmission of spectral energy values, or the frequency resolution value and noise value, specifically for the respective time domain, i.e. QMF slots 0 and 1, is actually not justified, since the domain does obviously not correspond to any transient, but, conversely, is very small in terms of time. This "expensive" envelope is therefore highlighted in a hatched manner in FIG. 6a.

A similar problem will arise if a transient exists between two frames, or is detected by the transient detector 118. This case is represented in FIG. 6b. FIG. 6b shows two successive frames 502 and 504, each having a length of 16 QMF slots, a transient having been detected by the transient detector 118 between the two frames 502 and 504, or in the vicinity of the frame boundary between these two SBR frames 502 and 504, so that both frames 502 and 504 have been associated with an LD_TRAN class by the SBR frame controller 116, both with only two envelopes 502a, 502b, and 504a and 504b, respectively, such that the transient envelopes 502b of the leading frame 502 and the transient envelope 504b of the subsequent frame 504 will border on the SBR frame boundary. As may be seen, the transient envelope 502b of the first frame 502 is extremely short and extends only over one QMF slot. Even for the presence of a transient, this represents a disproportionately large amount of expenditure for envelope encoding, since spectral data are again encoded for the subsequent transient envelope 504b, as was described above. Therefore, the two transient envelopes 502b and 504b are highlighted in a hatched manner.

Both cases which have been outlined above with reference to FIGS. 6a and 6b have in common, therefore, that in each case envelopes (hatched area) are needed which describe a relatively short period and accordingly cost too many, or a relatively large number of, bits. These envelopes contain a spectral data set which might as well describe a complete frame. However, the precise time division is necessary to encapsulate the energy around the transients, since otherwise pre-echoes will arise, as has been described in the introduction to the description of the present application.

Therefore, a description will be given below of an alternative mode of operation of an encoder and/or a decoder, by means of which the above problems in FIGS. 6a and 6b are addressed, or data sets which describe too short a time period need not be transmitted on the encoder side.

Figure 7A:
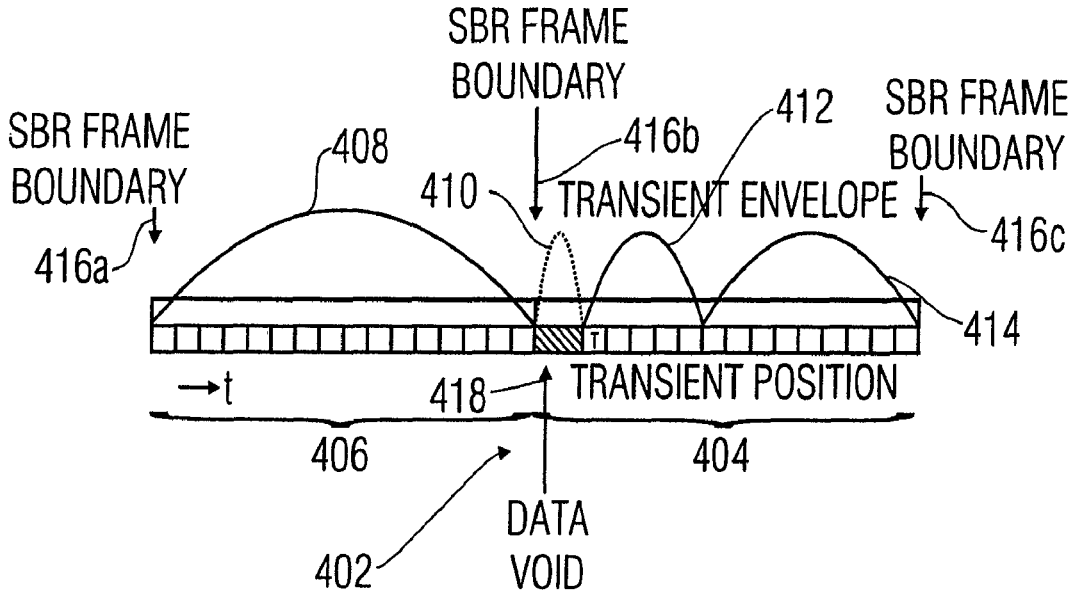

If one considers, for example, the case of FIG. 6a, wherein the transient detector 118 indicates the presence of a transient in the vicinity of the start of the frame 404, the SBR frame controller 116 will still associate, in the embodiment described, the LD_TRAN class comprising the same transient position indication with this frame, but no scale factors and/or spectral energy values, and no noise portion are generated by the envelope data calculator 112 and the envelope data encoder 114 for the envelope 410, and no frequency resolution indication is forwarded to the formatter 108 for this envelope 410 by the SBR frame controller 116, which is indicated in FIG. 7a, which corresponds to the situation of FIG. 6a, in that the line of the envelope 410 is depicted as a dashed line and that the respective QMF slots are hatched to indicate that for this purpose, the data stream output by the formatter 108 in the output 104 actually contains no data for high-frequency reconstruction. On the decoder side, this "data void" 418 is filled in that all necessary data, such as scale factors, noise portion and frequency resolution, is obtained from the respective data of the preceding envelope 408. More specifically, and as will be explained below in more detail with reference to FIG. 9, the envelope data decoder 320 concludes from the transient position indication for the frame 404 that the case at hand is a case in accordance with FIG. 6a, so that it does not expect any envelope data for the first envelope in the frame 404. To symbolize this alternative mode of operation, FIG. 5 indicates, by means of a dashed arrow, that in terms of its mode of operation, or syntactical analysis, the envelope data decoder 320 also depends on the syntax elements which are printed in bold in FIG. 2, in this case particularly on the syntax element bs_transient_position. Now the envelope data decoder 320 fills the data void 418 in that it copies the respective data from the preceding envelope 408 for the envelope 410. In this manner, the data set of the envelope 408 is extended from the preceding frame 406 to the first (hatched) QMF slots of the second frame 404, as it were. Thus, the time grid of the missing envelope 410 in the decoder 300 is reconstructed again, and the respective data sets are copied. Thus, the time grid of FIG. 7a again corresponds to that of FIG. 6a with regard to the frame 404.

The approach in accordance with FIG. 7a offers a further advantage over the approach described above with reference to FIG. 3, since in this manner it is possible to accurately signal the transient start on the QMF slot. The transients detected by the transient detector 118 may be mapped more sharply as a result. To illustrate this further, FIG. 8 depicts the case where, in accordance with FIG. 3, a FIXFIX frame 602 comprising an envelope 604 is followed by an LD_TRAN frame 606 comprising two envelopes, namely a transient envelope 608 and a final envelope 610, the transient position indication pointing to the second QMF slot. As may be seen from FIG. 8, the transient envelope 608 comprising the first QMF slot of the frame 606 starts in the same manner as it would have done in the case of a transition position indication pointing to the first QMF slot, as may be seen from FIG. 3. The reason for this approach is that it is less worthwhile, for reasons of encoding efficiency, to provide a third envelope at the start of the frame 606 in the shifting of the transient position indication from TRANS-POS=0 to TRANS-POS=1, since, to this end, envelope data would specifically have to be transmitted again. In accordance with the approach of FIG. 7a, this does not present a problem, since it is obvious that no envelope data at all need to be transmitted for the start envelope 410. For this reason, an alignment—in units of QMF slots—of the transient envelope as a function of the transient position indication in LD_TRAN classes is possible in an effective manner in accordance with the approach of FIG. 7a, for which purpose a possible embodiment is represented in the table of FIG. 9. The table of FIG. 9 represents a possible table as may be used in the encoder of FIG. 1 and the decoder of FIG. 5, as an alternative to the table of FIG. 3, in the context of the alternative approach of FIG. 7a. The table includes seven columns, wherein the categories of the first five correspond to the first five columns in FIG. 3, i.e. wherein from the first to the fifth columns the transient position indication and, for this transient position indication, the number of the envelopes provided in the frame, the location of the first envelope boundary, the location of the second envelope boundary, and the transient index pointing to the envelope within which the transient is located, are listed. The sixth column indicates the transient position indication for which a data void 418 is provided in accordance with FIG. 7a. As is indicated by a one, this is the case for transient position indications located between one and five (inclusively, in each case). For the remaining transient position indications, a zero has been entered in this column. The last column will be dealt with below with reference to FIG. 7b.

Figure 7B:
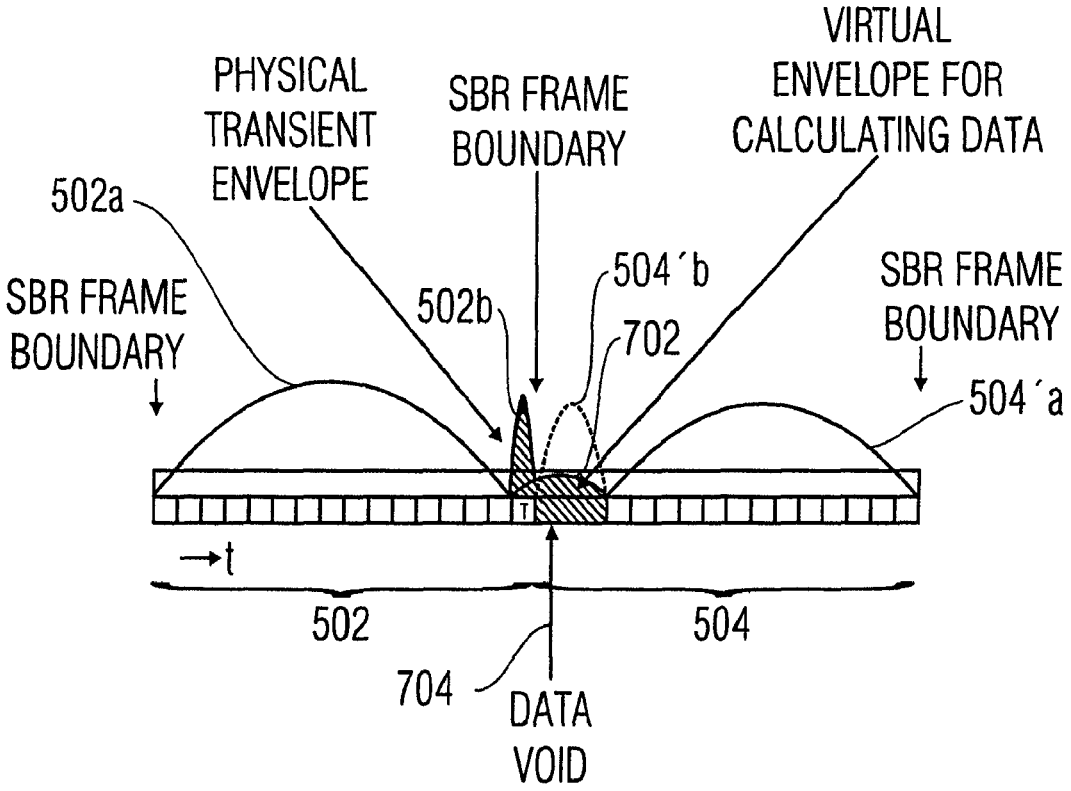
Figures 8, 9:
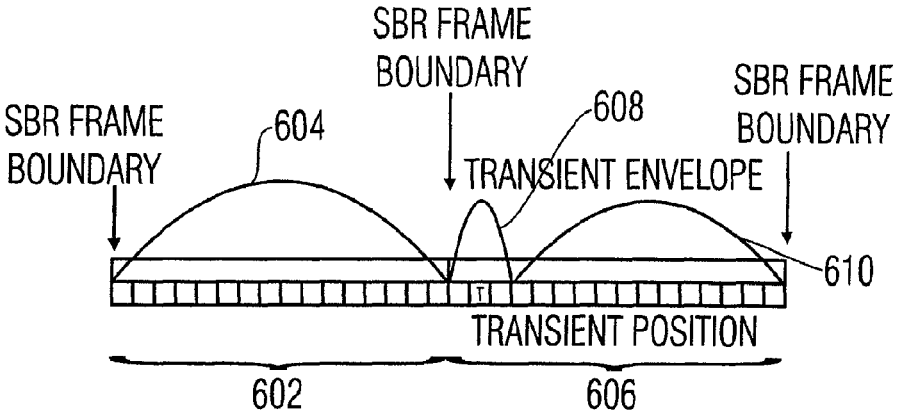
FIG. 8 is a schematic representation for illustrating an LD_TRAN frame with a transient position TranPos=1 in accordance with the table of FIG. 3.
FIG. 9 shows a table which may be defined, on the encoder and decoder sides, to obtain, from the syntax element bs_transient_position in FIG. 2, the information on the number of envelopes and/or grid areas and the positions of the grid area boundary (boundaries) within an LD_TRAN frame as well as the information on the data acceptance from the previous frame in accordance with FIG. 7a and the data extension into the subsequent frame in accordance with FIG. 7b.

Considering the case of FIG. 6b, in accordance with an approach which is provided as an alternative or in addition to the modification in accordance with FIG. 7a, an unfavorable division of the transient area into the transient envelopes 502b and 504b is prevented in that virtually an envelope 502 is used which extends over the QMF slots of both transient envelopes 502b and 504b, that the scale factors which are obtained across this envelope 402 are transmitted along with the noise portion and the frequency resolution, but only for the transient envelope 502b of the frame 502, and are simply used, on the decoder side, also for the QMF slots at the start of the following frame, as is indicated in FIG. 7b, which otherwise corresponds to FIG. 6b, by the single hatching of the envelope 502b, the indication of the transient envelope 504b by a dashed line, and the hatching of the QMF slot at the start of the second frame 504.

Put more specifically, in the event of the occurrence of a transient between the frames 502 and 504 in accordance with FIG. 7b, the encoder 100 will act in the following manner. The transient detector 118 indicates the occurrence of the transient. Thereupon, the SBR frame controller 116 selects, for the frame 502, as in the case of FIG. 6b, the LD_TRAN class comprising a transient position indication pointing to the last QMF slot. However, due to the fact that the transient position indication points to the end of the frame 502, the envelope data calculator 112 forms, from the QMF output values, the scale factors or spectral energy values, but not only across the QMF slot of the transient envelope 502b, but rather across all QMF slots of the virtual envelope 702, which additionally comprises the three QMF slots immediately following the following frame 504. As a result, a delay is not connected at the output 104 of the encoder 100, since the audio encoder 106n can forward the frame 504 to the formatter 108 only at the frame end. In other words, the envelope data calculator 112 forms the scale factors by averaging across the QMF values of the QMF slots of the virtual envelope 702 in a predetermined frequency resolution, the resulting scale factors being encoded by the envelope encoder 114 for the transient envelope 502b of the first frame 502 and being output to the formatter 108, the SBR frame controller 116 forwarding the respective frequency resolution value for this transient envelope 502b. Irrespective of the decision regarding the class of the frame 502, the SBR frame controller 116 makes the decision on the class membership of the frame 504. In the present case, by way of example, no transient is now located in the vicinity of the frame 504 or within the frame 504, so that the SBR frame controller 116 selects, in this exemplary case of FIG. 7b, a FIXFIX class for the frame 504 with only one envelope 504a'. The SR frame controller 116 outputs the respective decision to the formatter 108 and to the envelope data calculator 112. However, the decision is interpreted in a different way than usual. The envelope data calculator 112 namely has "remembered" that the virtual envelope 702 has extended into the current frame 504, and it therefore shortens the immediately adjacent envelope 504a' of the frame 504 by the respective number of QMF slots in order to determine the respective scale values only across this smaller number of QMF slots and output same to the envelope data encoder 114. Thus, a data void 704 arises, in the data stream at the output 104, across the first three QMF slots. In other words, in accordance with the approach of FIG. 7b, the complete data set is initially calculated, on the encoder side, for the envelope 702, for which purpose one also uses data from the future QMF slots, from the point of view of the frame 502, at the start of the frame 504, by means of which the spectral envelope is calculated at the virtual envelope. This data set is then transmitted to the decoder as belonging to the envelope 502b.

At the decoder, the envelope data decoder 320 generates the scale factors for the virtual envelope 702 from its input data, as a result of which the gain values calculator 318 possesses all necessary information, for the last QMF slot of the frame 502, or the last envelope 502b, to perform the reconstruction still within this frame. The envelope data decoder 320 also obtains scale factors for the envelope(s) of the following frame 504 and forwards them to the gain values calculator 318. From the fact that the transient position input of the preceding LD_TRAN frame points to the end of this frame 502, said gain values calculator 318 knows, however, that the envelope data which has been transmitted for the final transient envelope 502b of this frame 502 also relates to the QMF slots at the start of the frame 504, which data belongs to the virtual envelope 702, which is why it introduces, or establishes, a specific envelope 504b' for these QMF slots, and assumes, for this envelope 504b' established, scale factors, a noise portion and a frequency resolution obtained by the envelope data calculator 112 from the respective envelope data of the preceding envelope 502b so as to calculate, for this envelope 504b', the spectral weighting values for the reconstruction within the module 312. The gain values calculator 318 only then applies the envelope data obtained from the envelope data decoder 320 for the actual subsequent envelope 504a' to the subsequent QMF slots following the virtual envelope 702, and forwards gain and/or weighting values which have been calculated accordingly to the subband adapter 312 for high-frequency reconstruction. In other words, on the decoder side, the data set for the virtual envelope 702 is initially applied only to the last QMF slot(s) of the current frame 502, and the current frame 502 is thus reconstructed without any delay. The data set of the second, subsequent frame 504 includes a data void 704, i.e. the new envelope data transmitted is valid only as from the following QMF slot, which is the third QMF slot in the exemplary example of FIG. 7b. Thus, only one single envelope is transmitted in the case of FIG. 7b. As in the first case, the missing envelope 504b' is again reconstructed and filled with the data of the previous envelope 502b. The data void 704 is thus closed, and the frame 504 may be reproduced.

In the exemplary case of FIG. 7b, the second frame 504 has been signaled with a FIXFIX class, wherein the envelope(s) actually span(s) the entire frame. However, as has just been described, on account of the preceding frame 502, or its LD_TRAN class membership comprising a high transient position indication, the envelope 504a' in the decoder is restricted, and the validity of the data set does not start, in terms of time, until several QMF slots later. In this context, FIG. 7b addressed the case where the transient rate is thin. However, if transients occur, in several successive frames, at the edges in each case, the transit position will be transmitted with the LDN-TRAN class in each case and will be expanded accordingly in the following frame, as has been described above with reference to FIG. 7b. The first envelope, respectively, is reduced in size, or restricted at its start, in accordance with the expansion, as was described by way of example above with reference to the envelope 504a' with reference to a FIXFIX class.

As was described above, it is known, among encoders and decoders, how far a transient envelope is expanded, at the end of an LD_TRAN frame, into the subsequent frame, a possible agreement on this also being depicted in the embodiment of FIG. 9, or in the table depicted there, which thus presents an example combining both modified approaches in accordance with FIGS. 7a and 7b. In this embodiment, Table 9 is used by the encoder and the decoder. For signaling the time grid of the envelopes, again, only transient index bs_transient_position is used. In the case of transient positions at the start of the frame, a transmission of an envelope is prevented (FIG. 7a), as was described above and may be seen from the second but last column of the table of FIG. 9. What is also established, in the last column of FIG. 9, in this connection is the expansion factor with which—or the number of QMF slots across which—a transient envelope at the end of the frame is to be expanded into the subsequent frame (cf. FIG. 7b). A difference in the signaling in accordance with FIG. 9 with regard to the first case (FIG. 7a) and the second case (FIG. 7b) consists in the point of time of the signaling. In case 1, the signaling takes place in the current frame, i.e. there is no dependence regarding the preceding frame. It is only the transient position that is crucial. The cases in which the first envelope of a frame is not transmitted may be seen, accordingly, on the decoder side, from a table as in FIG. 9 comprising entries for all transient positions.

In the second case, however, the decision is made in the preceding frame and transferred into the next one. Using the last table column in FIG. 9, specifically, an expansion factor is specified the transient position of the predecessor frame at which the transient envelope of the predecessor frame is to be expanded into the next frame, and to what extent. This means that—if in a frame a transition position is established at the end of the current frame, in accordance with FIG. 9, at the last or second but last QMF slot—the expansion factor indicated in the last column of FIG. 9 will be stored for the next frame, by which means the time grid for the next frame is thereby established, or specified.

Before a next embodiment of the present invention will be addressed below, it shall be mentioned before that, similarly to the approach for generating the envelope data for the virtual envelope in accordance with FIG. 7b, the generation of the envelope data for the envelope 408, in the example of FIG. 7a, could also be determined over an extended time period, i.e. by the two QMF slots of the "saved" envelope 410, so that the QMF output values of the analysis filter bank 110 for these QMF slots will also be included in the respective envelope data of the envelope 408. However, the alternative approach is also possible, in accordance with which the envelope data for the envelope 408 is determined only via the QMF slots associated with it.

The preceding embodiments avoided a large amount of delay using an LD-TRAN class. What follows is a description of an embodiment in accordance with which the avoidance is achieved by means of a grid, or envelope, classification wherein envelopes may also extend across frame boundaries. In particular, it shall be assumed in the following that the encoder of FIG. 1 generates, at its output 104, a data stream wherein the frames are classified into four frame classes, i.e. a FIXFIX, a FIXVAR, a VARFIX and a VARVAR class, as has been established in the above-mentioned MPEG4-SBR standard.

As is described in the introduction to the description of the present application, the SBR frame controller 116, too, classifies the sequence of frames into envelopes which may also extend across frame boundaries. To this end, syntax elements bs_num_rel_# are provided which specify for frame classes FIXVAR, VARFIX and VARVAR, among other things, the position—in relation to the leading or trailing frame boundary of the frame—at which the first envelopes starts and/or the last envelope of this frame ends. The envelope data calculator 112 calculates the spectral values, or scale factors, for the grid specified by the envelopes with the frequency resolution specified by the SBR frame controller 116. As a consequence, envelope boundaries may be arbitrarily spread, for the SBR frame controller 116, across the frames and an overlap region by means of these classes. The encoder of FIG. 1 may perform the signaling with the four different classes in such a manner that a maximum overlap region from one frame results, which corresponds to the delay of the CORE encoder 106 and, thus, also to the time period which may be buffered without causing an additional delay. Thus it is ensured that there will be sufficient "future" values available for the envelope data calculator 112 for pre-calculating and sending envelope data even though most of these data will have validity only in later frames.

Figure 10:
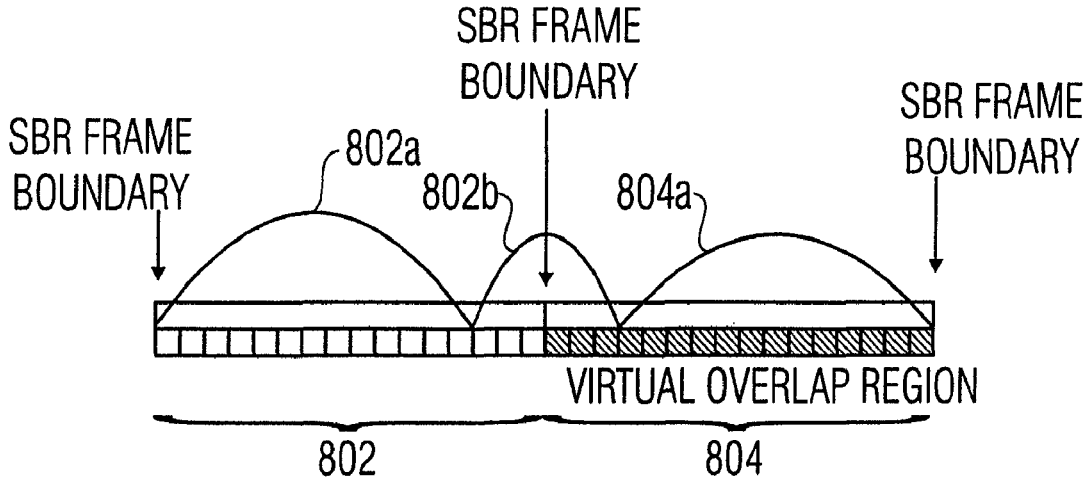
FIG. 10 is a schematic representation of a FIXVAR-VARFIX sequence for illustrating an envelope signaling with envelopes extending across frame boundaries.

In accordance with the present embodiment, however, the decoder of FIG. 5 now processes such a data stream with the four SBR classes in a manner resulting in a low latency with simultaneous compacting of the spectral data. This is achieved by data voids in the bit stream. To this end, reference shall initially be made to FIG. 10 which shows two frames including their classification as results, in accordance with the embodiment, from the encoder of FIG. 1, the first frame being a FIXVAR frame and the second frame being a VARFIX frame in this case, by way of example. In the exemplary case of FIG. 10, the two successive frames 802 and 804 comprise two, or one, envelope(s), namely envelopes 802a and 802b, and/or envelopes 804a, respectively, the second envelope of the FIXVAR frame 802 extending into the frame 804 by three QMF slots, and the start of the envelope 804a of the VARFIX frame 804 being located at QFM slot 3 only. With regard to each envelope 802a, 802b and 804a, the data stream at the output 104 contains scale factor values determined by the envelope data calculator 112 by averaging the QMF output signal of the analysis filter bank 110 across the respective QMF slots. For determining the envelope data for the envelope 802b, the calculator 112 resorts to "future" data of the analysis filter bank 110, as was mentioned above, for which purpose a virtual overlap region the size of a frame is available, as is indicated in a hatched manner in FIG. 10.

To reconstruct the high-frequency portion for the envelope 802b, the decoder would have to wait until it receives the reconstructed low-frequency portion from the analysis filter band 310, which would cause a delay the size of a frame, as was mentioned above. This delay may be prevented if the decoder of FIG. 5 operates in the following manner. The envelope data decoder 320 outputs the envelope data and, in particular, the scale factors for the envelopes 802a, 802b and 804a to the gain values calculator 318. However, the latter uses the envelope data for the envelope 802b, which extends into the subsequent frame 804, however initially only for a first part of the QMF slots across which this envelope 802b extends, namely that part going as far as the SBR frame boundary between the two frames 802 and 804. Consequently, the gain values calculator 318 re-interprets the envelope division in relation to the division as provided by the encoder of FIG. 1 in the encoding, and uses the envelope data initially only for that part of the overlap envelope 802b which is located within the current frame 802. This part is illustrated as envelope 802$b_1$ in FIG. 11, which corresponds to the situation of FIG. 10. In this manner, the gain values calculator 318 and the subband adapter 312 are able to reconstruct the high-frequency portion for this envelope 802$b_1$ without any delay.

Due to this re-interpretation, the data stream at the input 302 naturally lacks envelope data for the remaining part of the overlap envelope 802b. The gain values calculator 318 overcomes this problem in a similar manner to the embodiment of FIG. 7b, i.e. it uses envelope data derived from that for the envelope 802$b_1$ so as to reconstruct, on the basis of same, along with the subband adapter 312, the high-frequency portion at the envelope 802$b_2$ extending over the first QMF slots of the second frame 804 which correspond to the remaining part of the overlap envelope 802b. In this manner, the data void 806 is filled.

Following the previous embodiments, wherein the transient problem was addressed in different ways in a manner which is effective in terms of bit rates, a description shall be given below of an embodiment in accordance with which a modified FIXFIX class as an example of a class with a frame and grid boundary match is configured, in its syntax, in such a manner that it comprises a flag, or a transient absence indication, whereby it is possible to reduce the frame size while incurring bit-rate losses, but at the same time to reduce the quantity of the losses, since stationary parts of the information and/or audio signal can be encoded in a more bit rate-effective manner. In this context, this embodiment may be employed both additionally in the above-described embodiments and independently of the other embodiments in the context of a frame class division with FIXFIX, FIXVAR, VARFIX and VARVAR classes as was described in the introduction to the description of the present application, but while modifying the FIXFIX class, as will be described below. Specifically, in accordance with this embodiment, the syntax description of a FIXFIX class, as was described above also with reference to FIG. 2, is supplemented by a further syntax element, such as a one-bit flag, the flag being set, on the encoder side, by the SBR frame controller 116 as a function of the location of the transients detected by the transient detector 118, to indicate that the information signal is or is not stationary in the area of the respective FIXFIX frame. In the former case, such as with a set transient absence flag, in the event that the FIXFIX frame comprises several envelopes, no envelope data signaling, or no transmission of noise energy values and scale factors as well as frequency resolution values, is performed in the encoded data stream 104 for the envelope of the respective FIXFIX frame or for the first envelope, in terms of time, in this FIXFIX frame, but this missing information is obtained, on the decoder side, from the respective envelope data for that envelope of the preceding frame which is directly preceding, in terms of time, it also being possible for said frame to be a FIXFIX frame, for example, or any other frame, said envelope data being contained in the encoded information signal. In this manner, a bit rate reduction may thus be achieved for a variant of the SBR encoding with a smaller delay, or a combination of the bit rate increase in such a low-delay variant may be achieved on account of the increased, or doubled, repetition rate. In combination with the above-described embodiments, such a signaling provides a completion with regard to the bit rate reduction, since it is not only transient signals that may be transmitted and/or encoded in a bit rate-reduced manner, but also stationary signals. With regard to obtaining or deriving the missing envelope data information, reference shall be made to the description with regard to the previous embodiments, specifically with regard to FIGS. 12 and 7b.

The following shall be noted with regard to the illustrations concerning FIGS. 6a to 11. Sometimes, different tables from those of FIG. 3 have been used as the basis for these figures. Naturally, such differences may also apply to the definition of the noise envelopes. With LD_TRAN classes, the noise envelopes may extend across the entire frame, for example. In the case of FIGS. 7a and 7b, the noise values of the preceding frame or of the preceding envelope would then be used for high-frequency reconstruction on the part of the decoder, for example for the first few QMF slots, which in this case are 2 or 3 in number, by way of example, and the actual noise envelope would be shortened accordingly.

Figure 11:
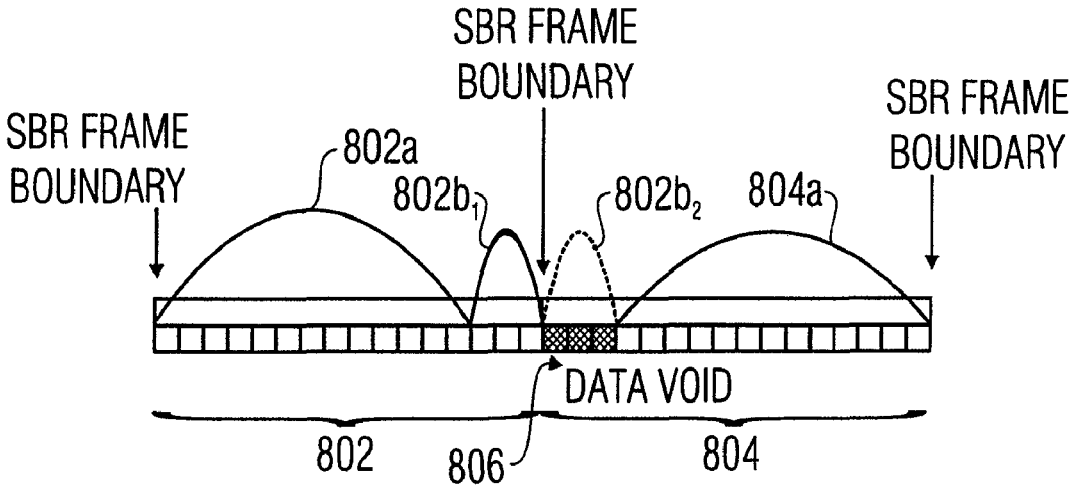
FIG. 11 is a schematic representation of a decoding which enables a shorter delay time despite envelope signaling in accordance with FIG. 10, in accordance with a further embodiment of the present invention.

In addition, it shall be noted, with regard to the approach of FIGS. 7b and 11, that there are numerous possibilities of how the envelope data or the scale factors for the virtual envelopes 702 and 802b, respectively, may be transmitted. As was described, scale factors are determined for the virtual envelope via the QMF slots, which are four in number, by way of example, in FIG. 7b, and six in number, by way of example, in FIG. 11, specifically by means of averaging, as was described above. In the data stream, these scale factors, determined via the respective QMF slots, for the transient envelope 502b or the envelope 502$b_1$ may be transmitted. In this case, the calculator 318 might possibly take into account, on the decoder side, that the scale factors, or the spectral energy values, have been determined, however, across the entire area to be four and six QMF slots, respectively, and it would therefore subdivide the magnitude of these values into the two partial envelopes 502b and 504b', respectively, and 802$b_1$ and 802$b_2$, respectively, in a ratio which corresponds, for example, to the ratio between the QMF slots associated with the first frames 502 and 802, respectively, and the second frames 504 and 804, respectively, so as to utilize the portions, thus subdivided, of the scale factors transmitted for controlling the spectral shaping in the subband adapter 312. However, it would also be possible that the encoder directly transmits such scale factors which may initially be directly applied, on the decoder side, for the first partial envelopes 502b and 802$b_1$, respectively, and which are re-scaled accordingly for the following partial envelopes 504b' or 804b' or 802$b_2$, respectively, depending on the overlap of the virtual envelopes 702 and 802b, respectively, with the second frames 504 and 804, respectively. The manner in which the energy is divided up between the two partial envelopes may be arbitrarily specified between the encoder and the decoder. In other words, the encoder may directly transmit such scale factors which may be directly applied, on the decoder side, for the first partial envelopes 502b and 502$b_1$, respectively, because the scale factors have only been averaged over these partial envelopes and/or the respective QMF slots. This case may be illustrated, by way of example, as follows. In the event of a more or less overlapping envelope, wherein the first part consists of two time units, or QMF slots, and the second consists of three time units, what happens on the encoder side is that only the first part is correctly calculated and/or the energy values are averaged only in this part, and the respective scale factors are output. In this manner, the envelope data precisely matches the respective time portion in the first part. However, the scale factors for the second part are obtained from the first part and are scaled in accordance with the dimensional proportions as compared to the first part, i.e., in this case, 3/2 times scale factors of the first part. This opportunity shall be taken to point out that in the above the term 'energy' was used synonymously with scale factor; energy, or scale factor, resulting from the sum of all energy values of an SBR band along a time period of an envelope. In the example which just been illustrated, the auxiliary scale factors in each case describe the sum of the energies of the two time units in the first part of the more or less overlapping envelope for the respective SBR band.

In addition, provision may also be made, of course, for the spectral envelopes, or scale values, to be transmitted, in the above embodiments, in a manner which is normalized to the number of QMF slots which are used for determining the respective value, such as the square average energy—i.e. the energy normalized to the number of contributing QMF slots and the number of QMF spectral bands—within each frequency/time grid area. In this case, the measures which have just been described for splitting, on the encoder side or decoder side, of the scale factors for the virtual envelopes into the respective sub-portions are not necessary.

With regard to the above description, several other points shall also be noted. Even though a description has been given, for example, in FIG. 1, that a spectral dispersion is performed, by means of the analysis filter bank 110, with a fixed time resolution, which will then be adapted, by the envelope data calculator 112, to the time/frequency grid set by the controller 116, alternative approaches are also feasible, in accordance with which—with regard to a time/frequency resolution adapted to the specification given by the controller 316—the spectral envelope in this resolution is calculated directly, without the two stages as are shown in FIG. 1. The envelope data encoder 114 of FIG. 1 may be missing. On the other hand, the type of the encoding of the signal energies representing the spectral envelopes could be performed, for example, by means of differential encoding, it being possible for the differential encoding to be implemented in a time or frequency direction or in a hybrid form, such as in a frame-wise or envelope-wise manner in the time and/or frequency direction(s). It shall be noted, with reference to FIG. 5, that the order in which the gain values calculator performs the normalization with the signal energies contained in the high-frequency portion which is preliminarily reproduced, and the weighting with the signal energies transmitted by the encoder for signaling the spectral envelopes, are irrelevant. The same naturally also applies to the correction for taking into account the noise portion values per noise envelope. It shall also be noted that the present invention is not boundaryed to spectral dispersions by means of filter banks. Rather, a Fourier transformation and/or inverse Fourier transformation or similar time/frequency transformations could naturally also be employed, wherein, for example, the respective transformation window is shifted by the number of audio values which is to correspond to a time slot. It shall also be noted that there may be provisions that the encoder does not perform the determination and the encoding of the spectral envelope and the introduction of same into the encoded audio signal with regard to all subbands in the high-frequency portion in the time/frequency grid. Rather, the encoder could also determine such portions of the high-frequency portion for which it is not worthwhile to perform a reproduction on the decoder side. In this case, the encoder transmits, to the decoder, for example, the portions of the high-frequency portion and/or the subband areas in the high-frequency portion for which the reproduction is to be performed. In addition, various modifications are also possible with regard to setting the grid in the frequency direction. For example, one may provide that no setting of the frequency grid is performed, wherein in this case the syntax elements bs_freq_res could be missing and, for example, the full resolution would be used. In addition, an adjustability of the quantization step width of the signal energies for representing the spectral envelopes may be omitted, i.e. the syntax element bs_amp_res could be missing. In addition, a different down-sampling could be performed in the down-sampler of FIG. 1 instead of a down-sampling by every other audio value, so that high and low-frequency portions would have different spectral extensions. In addition, the table-assisted dependence of the grid division of the LD_TRAN frames on bs_transient_position is only exemplary, and an analytical dependence of the envelope extensions and of the frequency resolution would also be feasible.

At any rate, the above-described examples of an encoder and a decoder allow the use of the SBR technology also for the AAC-LD encoding scheme of the above-cited standard. The large delay of AAC+SBR, which conflicts with the goal of AAC-LD with a short algorithmic delay of about 20 ms at 48 kHz and a block length of 480, may be overcome using the above embodiments. Here, the disadvantage of a linkage of AAC-LD with the previous SBR defined in the standard, which is due to the shorter frame length of the AAC-LD 480 or 512 as compared to 960 or 1024 for AAC-LD, which frame length causes the data rate for an unchanged SBR element as defined in the standard to double that of HE AAC, would be overcome. Subsequently, the above embodiments enable the reduction of the delay of AAC-LD+SBR and a simultaneous reduction of the data rate for the side information.

In particular, in the above embodiments, the delays for an LD variant of the SBR module the overlap region of the SBR frames was removed in order to reduce the system. Thus, the possibility of being able to place envelope boundaries and/or grid boundaries irrespective of the SBR frame boundary is dispensed with. The treatment of transients, however, is then taken over by the new frame class LD_TRAN, so that the above embodiments also necessitate only one bit for signaling so as to indicate whether the current SBR frame is that of a FIXFIX class or of an LD_TRAN class.

In the above embodiments, the LD_TRAN class was defined such that it has envelope boundaries, in a manner which is synchronized to the SBR frame, at the edges and variable boundaries within the frame. The interior distribution was determined by the position of the transients within the QMF slot grid or time slot grid. A small envelope which encapsulates the energy of the transient was distributed around the position of the transient. The remaining areas were filled up with envelopes to the front and to the back up to the edges. To this end, the table of FIG. 3 was used by the envelope data calculator 312 on the encoder side, and by the gain values calculator 318 on the decoder side, where a predefined envelope grid is stored in accordance with the transient position, the table of FIG. 3 naturally only being exemplary, and, in individual cases, variations may naturally also be made, depending on the case of application.

In particular, the LD_TRAN class of the above embodiments thus enables compact signaling and adjusting of the bit requirement to an LD environment with a double frame rate, which thus also necessitates a double data rate for the grid information. Thus, the above embodiments eliminate disadvantages of previous SBR envelope signaling in accordance with the standard, which disadvantages consisted in that for VARVAR, VARFIX and FIXVAR classes the bit requirements for transmitting the syntax elements and/or side information were high-scale, and that for the FIXFIX class a precise temporal adjustment of the envelopes to transients within the block was not possible. By contrast, the above embodiments enable conducting a delay optimization on the decoder side, specifically a delay optimization by six QMF time slots or 384 audio samples in the audio signal original area, which roughly corresponds to 8 ms at 48 kHz of audio signal sampling. In addition, the elimination of the VARVAR, VARFIX and FIXVAR frame classes enables savings in the data rate for the transmission of the spectral envelopes, which results in the possibility of higher data rates for low-frequency encoding and/or the core and, thus, improved audio quality. Effectively, the above embodiments provide the transients to be enveloped within the LD_TRAN class frames which are synchronous to the SBR frame boundaries.

It shall be noted, in particular, that, unlike the previous exemplary table of FIG. 3, the transient envelope length may also comprise more than only 2 QMF time slots, the transient envelope length being smaller than ⅓ of the frame length, however.

With regard to the above description it shall also be noted that the present invention is not boundaryed to audio signals. Rather, the above embodiments could naturally also be employed in video encoding.

It shall also be noted with regard to the above embodiments that the individual blocks in FIGS. 1 and 5 may be implemented both in hardware and in software, for example, e.g. as parts of an ASIC or as program routines of a computer program.

This opportunity shall be taken to note that, depending on the circumstances, the inventive scheme may also be implemented in software. Implementation may be on a digital storage medium, in particular a disk or CD with electronically readable control signals which may interact with a programmable computer system such that the respective method is performed. Generally, the invention thus also consists in a computer program product with a program code, stored on a machine-readable carrier, for performing the inventive method, when the computer program product runs on a computer. In other words, the invention may thus be realized as a computer program having a program code for performing the method, when the computer program runs on a computer. With regard to the embodiments discussed above, it shall also be noted that the encoded information signals generated there may be stored on, e.g., a storage medium, such as an electronic storage medium.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

[1. An encoder comprising a low-frequency portion encoder for encoding a low-frequency portion of an information signal in units of frames of the information signal;

a localizer for localizing transients within the information signal;

an associator for, as a function of the localization, associating a respective reconstruction mode from among at least two possible reconstruction modes with the frames of the information signal, and, for frames which have associated therewith a first one of the at least two possible reconstruction modes, associating a respective transient position indication with these frames;

a generator for generating a representation of a spectral envelope of a high-frequency portion of the information signal in a temporal grid which depends on reconstruction modes associated with the frames, such that frames which have the first one of the at least two possible reconstruction modes associated therewith, the frame boundaries of these frames coincide with grid boundaries of the grid, and the grid boundaries of the grid within these frames depend on the transient position indication; and a combiner for combining the encoded low-frequency portion, the representation of the spectral envelope and information on the associated reconstruction modes and the transient position indications into an encoded information signal, wherein at least one of the low-frequency portion encoder, the localizer, the associator, the generator and the combiner comprises a hardware implementation.]

[2. The encoder as claimed in claim 1, wherein the generator is formed such that the grid boundaries within the frame, which have the first one of the at least two possible reconstruction modes associated therewith, are located such that they specify at least a first grid area whose position within the respective frame depends on the transient position indication, and whose temporal extension is smaller than ⅓ of a length of the frames, as well as a second and/or a third grid area(s) which take(s) up the remaining part of the respective frame from the first grid area to the frame boundary, which is leading in terms of time and/or trailing in terms of time, of the respective frame.]

[3. The encoder as claimed in claim 2, wherein the generator and the combiner are formed to introduce, for a frame having the first reconstruction mode associated with it which comprises three grid areas and wherein the first grid area among the three grid areas is closer to a preceding frame than a predetermined value, one or several spectral envelope values describing the spectral envelope with a respective frequency resolution, only for the first and third grid areas, into the encoded information signal, and to introduce no spectral envelope value into the encoded information signal for the second grid area of this frame.]

[4. The encoder as claimed in claim 2, wherein the generator and the combiner are formed to introduce, for a frame having the first reconstruction mode associated with it, which comprises only two grid areas and wherein the first grid area borders on the frame boundary which is trailing in terms of time, one or several spectral envelope values, for both grid areas, said one or several spectral envelope value(s) describing the spectral envelope with a respective frequency resolution, into the encoded information signal, and to also use, for determining the spectral envelope value(s) for the first grid area, parts of the information signal located in the extension grid area in the subsequent frame which borders on the trailing frame boundary, and to shorten a grid area, which is leading in terms of time, of the subsequent frame as is specified by the reconstruction mode of the subsequent frame, so as to start only at the extension grid area.]

[5. The encoder as claimed in claim 3, wherein the generator and the combiner are formed to introduce one or several spectral envelope values into the encoded information signal for a frame having the second reconstruction mode associated with it or having the first reconstruction mode associated with it, but for which neither the condition that it comprises three grid areas and that, at the same time, the first grid area among the three grid areas is located closer to the preceding frame than the predetermined value, nor the condition that it comprises only two grid areas and that, at the same time, the first grid area borders on the frame boundary which is trailing in terms of time, are fulfilled, for each grid area of this frame.]

[6. The encoder as claimed in claim 2, wherein the generator is formed such that the first grid area borders on the frame boundary, leading in terms of time, of the respective frame if there is no second grid area, and wherein the first grid area borders on the frame boundary, trailing in terms of time, of the respective frame if no third grid area exists.]

[7. The encoder as claimed in claim 1, wherein the generator is formed such that the grid boundaries within frames which have the second of the at least two possible reconstruction modes associated with them are located such that they are equally distributed over time, so that these frames only comprise one grid area or are subdivided into equally sized grid areas.]

[8. The encoder as claimed in claim 1, wherein the associator is formed to associate a frame subdivision number indication with each frame which has the second of the at least two possible reconstruction modes associated with it, the generator being formed such that the grid boundaries within these frames subdivide these frames into a number of grid areas, said number depending on the respective frame subdivision number indication.]

[9. The encoder as claimed in claim 1, wherein the generator is formed such that the frame boundaries of the frames coincide with grid boundaries of the grid independently of the possible reconstruction modes associated with the frames.]

[10. The encoder as claimed in claim 1, wherein the generator comprises an analysis filter bank which generates a set of spectral values for each filter bank time slot of the information signal, each frame with a length of several filter bank time slots, and the generator further comprising an averager for averaging the energy spectral values in the resolution of the grid.]

[11. A decoder comprising an extractor for extracting, from the encoded information signal, an encoded low-frequency portion of an information signal, a representation of a spectral envelope of a high-frequency portion of the information signal, information on reconstruction modes associated with frames of the information signal and corresponding with one, respectively, of at least two reconstruction modes, and transient position indications associated with frames, in each case, which have a first one of the at least two reconstruction modes associated with them;

a low-frequency portion decoder for decoding the encoded low-frequency portion of the information signal in units of frames of the information signal;

a provider for providing a preliminary high-frequency portion signal on the basis of the decoded low-frequency portion; and an adaptor for spectrally adapting the preliminary high-frequency portion signal to the spectral envelopes by means of spectral weighting of the preliminary high-frequency portion signal as a function of the representation of the spectral envelopes in a temporal grid which depends on the reconstruction modes associated with the frames, such that for frames having the first one of the at least two possible reconstruction modes associated with them, the frame boundaries of these frames coincide with grid boundaries of the grid, and the grid boundaries of the grid within these frames depend on the transient position indication, wherein at least one of the extractor, the low-frequency portion decoder, the provider, and the adaptor comprises a hardware implementation.]

[12. The decoder as claimed in claim 11, wherein the adaptor for spectrally adapting is formed such that the grid boundary, or grid boundaries, within a frame having the first one of the at least two possible reconstruction modes associated with it is/are located such that it/they specify/specifies at least a first grid area whose position within the respective frame depends on the transient position indication, and whose temporal extension is smaller than ⅓ of a length of the frames, as well as a second and/or third grid area(s) which take(s) up the remaining part of the respective frame from the first grid area up to the frame boundary, which is leading in terms of time, or trailing in terms of time, of the respective frame.]

[13. The decoder as claimed in claim 12, wherein the extractor is formed to expect one or several spectral envelope values in the encoded information signal, and to extract same from the encoded information signal, only for the first and third grid areas, for a frame having the first reconstruction mode associated with it which comprises three grid areas and wherein the first grid area among the three grid areas is more to a preceding frame than a predetermined value, said one or several spectral envelope values describing the spectral envelope with a respective frequency resolution, and to obtain, for the second grid area, one or several spectral envelope values for the representation of the spectral envelope from the grid area, which is the last in terms of time, of the preceding frame.]

[14. The decoder as claimed in claim 12, wherein the extractor is formed to expect one or several spectral envelope values in the encoded information signal, and to extract same from the encoded information signal, for both grid areas, for a frame having the first reconstruction mode associated with it which comprises two grid areas and wherein the first grid area borders on the frame boundary, trailing in terms of time, of the frame, said one or several spectral envelope values describing the spectral envelope with a respective frequency solution, and to obtain from the spectral envelope value(s) for the first grid area one or several spectral envelope value(s) for a supplemental grid area in the subsequent frame, said supplementary grid area bordering on the trailing frame boundary, and to shorten accordingly a grid area, leading in terms of time, of the subsequent frame, as is defined by the reconstruction mode of the subsequent frame, so as to start only at the supplementary grid area, wherein the temporal grid within the subsequent frame is subdivided, the adaptor for spectral adaptation being formed to perform the adaptation in the subdivided temporal grid.]

[15. The decoder as claimed in claim 13, wherein the extractor is formed to introduce one or several spectral envelope values into the encoded information signal, or to extract same from the encoded information signal, for a frame having the second reconstruction mode associated with it or having the first reconstruction mode associated with it, but for which neither the condition that it comprises three grid areas and that, at the same time, the first grid area among the three grid areas is located closer to the preceding frame than the predetermined value, nor the condition that it comprises only two grid areas and that, at the same time, the first grid area borders on the frame boundary which is trailing in terms of time, are fulfilled, for each grid area of this frame.]

[16. The decoder as claimed in claim 15, wherein the adaptor for spectrally adapting is formed such that the first grid area borders on the frame boundary, leading in terms of time, of the respective frame if there is no second grid area, and wherein the first grid area borders on the frame boundary, trailing in terms of time, of the respective frame if no third grid area exists.]

[17. The decoder as claimed in claim 11, wherein the adaptor for spectrally adapting is formed such that the grid boundaries within frames which have the second of the at least two possible reconstruction modes associated with them are located such that they are equally distributed over time, so that these frames only comprise one grid area or are subdivided into equally sized grid areas.]

[18. The decoder as claimed in claim 11, wherein the extractor is formed to extract, from the encoded information signal, also a frame subdivision number indication which is associated, in each case, with frames which have the second of the possible reconstruction modes associated with them, the adaptor for spectrally adaptating being formed such that the grid boundaries within these frames are subdivided into a number of grid areas, said number depending on the respective frame subdivision number indication.]

[19. The decoder as claimed in claim 11, wherein the adaptor for spectrally adapting is formed such that the frame boundaries of the frames coincide with grid boundaries of the grid independently of the possible reconstruction modes associated with the frames.]

[20. The decoder as claimed in claim 11, wherein the adaptor for spectrally adapting comprises an analysis filter bank which generates a set of spectral values for each filter bank time slot of the information signal, each frame with a length of several filter bank time slots, and the adaptor for spectrally adapting further comprising a determinator for determining the energy of the spectral values in the resolution of the grid.]

[21. The decoder as claimed in claim 20, wherein the transient position indication is defined in units of the filter bank time slots.]

[22. The decoder as claimed in claim 11, wherein the information signal is an audio signal.]

[23. A method of encoding, comprising:

encoding, performed by a low-frequency portion encoder, a low-frequency portion of an information signal in units of frames of the information signal;

localizing, performed by a localizer, transients within the information signal;

associating, performed by an associator, as a function of the localization, a respective reconstruction mode from among at least two possible reconstruction modes with the frames of the information signal, and, for frames which have associated therewith a first one of the at least two possible reconstruction modes, associating a respective transient position indication with these frames; and generating, performed by a generator, a representation of a spectral envelope of a high-frequency portion of the information signal in a temporal grid which depends on the reconstruction modes associated with the frames, such that frames which have the first one of the at least two possible reconstruction modes associated therewith, the frame boundaries of these frames coincide with grid boundaries of the grid, and the grid boundaries of the grid within these frames depend on the transient position indication; and combining, performed by a combiner, the encoded low-frequency portion, the representation of the spectral envelope and information on the associated reconstruction modes and the transient position indications into an encoded information signal, wherein at least one of the low-frequency portion encoder, the localizer, the associator, the generator and the combiner comprises a hardware implementation.]

[24. A method of decoding, comprising:

extracting, performed by an extractor, from the encoded information signal, an encoded low-frequency portion of an information signal, a representation of a spectral envelope of a high- frequency portion of the information signal and information on reconstruction modes associated with frames of the information signal and corresponding with one, respectively, of at least two reconstruction modes, and transient position indications associated with frames, in each case, which have a first one of the at least two reconstruction modes associated with them;

decoding, performed by a low-frequency portion decoder, the encoded low-frequency portion of the information signal in units of frames of the information signal;

providing, performed by a provider, a preliminary high-frequency portion signal on the basis of the decoded low-frequency portion; and spectrally adapting, performed by an adaptor, the preliminary high-frequency portion signal to the spectral envelopes by means of spectral weighting of the preliminary high-frequency portion signal as a function of the representation of the spectral envelopes in a temporal grid which depends on the reconstruction modes associated with the frames, such that for frames having the first one of the at least two possible reconstruction modes associated with them, the frame boundaries of these frames coincide with grid boundaries of the grid, and the grid boundaries of the grid within these frames depend on the transient position indication, wherein at least one of the extractor, the low-frequency portion decoder, the provider, and the adaptor comprises a hardware implementation.]

[25. A non-transitory computer-readable storage medium having stored thereon a computer program for performing, when the computer program runs on a computer, a method of decoding, comprising:

extracting, from the encoded information signal, an encoded low-frequency portion of an information signal, a representation of a spectral envelope of a high-frequency portion of the information signal and information on reconstruction modes associated with frames of the information signal and corresponding with one, respectively, of at least two reconstruction modes, and transient position indications associated with frames, in each case, which have a first one of the at least two reconstruction modes associated with them;

decoding the encoded low-frequency portion of the information signal in units of frames of the information signal;

providing a preliminary high-frequency portion signal on the basis of the decoded low-frequency portion; and spectrally adapting the preliminary high-frequency portion signal to the spectral envelopes by means of spectral weighting of the preliminary high-frequency portion signal as a function of the representation of the spectral envelopes in a temporal grid which depends on the reconstruction modes associated with the frames, such that for frames having the first one of the at least two possible reconstruction modes associated with them, the frame boundaries of these frames coincide with grid boundaries of the grid, and the grid boundaries of the grid within these frames depend on the transient position indication.]

*26. A decoder comprising*

*an extractor for extracting, from an encoded information signal, an encoded low-frequency portion of an information signal, a representation of a spectral envelope of a high-frequency portion of the information signal, information on reconstruction modes associated with frames of the information signal and corresponding with one, respectively, of at least two possible reconstruction modes, and transient position indications associated with frames, in each case, which have a first one of the at least two possible reconstruction modes associated with them;*

*a low-frequency portion decoder for decoding the encoded low-frequency portion of the information signal in units of frames of the information signal;*

*a provider for providing a preliminary high-frequency portion signal on the basis of the decoded low-frequency portion; and*

*an adaptor for spectrally adapting the preliminary high-frequency portion signal to the spectral envelope by means of spectral weighting of the preliminary high-frequency portion signal as a function of the representation of the spectral envelope in a temporal grid which depends on the reconstruction modes associated with the frames, such that for frames having the first one of the at least two possible reconstruction modes associated with them, the frame boundaries of these frames coincide with grid boundaries of the grid, and the grid boundaries of the grid within these frames depend on the transient position indication,*

*wherein the adaptor for spectrally adapting is formed such that the grid boundaries within frames, which have the second of the at least two possible reconstruction modes associated therewith, are located such that they are equally distributed over time, so that these frames only comprise one grid area or are subdivided into equally sized areas,*

*wherein at least one of the extractor, the low-frequency portion decoder, the provider, and the adaptor comprises a hardware implementation.*

*27. The decoder as claimed in claim 26, wherein the adaptor for spectrally adapting comprises an analysis filter bank which generates a set of spectral values for each filter bank time slot of the information signal, each frame within a length of several filter bank time slots, and the adaptor for spectrally adapting further comprising a determinator for determining the energy of the spectral values in the resolution of the grid.*

*28. The decoder as claimed in claim 27, wherein the transient position indication is defined in units of the filter bank time slots.*

*29. The decoder as claimed in claim 26, wherein the information signal is an audio signal.*

*30. A method of decoding, comprising:*

*extracting, performed by an extractor, from an encoded information signal, an encoded low-frequency portion of an information signal, a representation of a spectral envelope of a high-frequency portion of the information signal and information on reconstruction modes associated with frames of the information signal and corresponding with one, respectively, of at least two possible reconstruction modes, and transient position indications associated with frames, in each case, which have a first one of the at least two possible reconstruction modes associated with them;*

*decoding, performed by a low-frequency portion decoder, the encoded low-frequency portion of the information signal in units of frames of the information signal;*

*providing, performed by a provider, a preliminary high-frequency portion signal on the basis of the decoded low-frequency portion; and*

*spectrally adapting, performed by an adaptor, the preliminary high-frequency portion signal to the spectral envelope by means of the spectral weighting of the preliminary high-frequency portion signal as a function of the representation of the spectral envelope in a temporal grid which depends on the reconstruction modes associated with the frames, such that for frames having the first one of the at least two possible reconstruction modes associated with them, the frame boundaries of these frames coincide with grid boundaries of the grid, and the grid boundaries of the grid within these frames depend on the transient position indication,*

*wherein the grid boundaries within frames, which have the second of the at least two possible reconstruction modes associated therewith, are located such that they are equally distributed over time, so that these frames only comprise one grid area or are subdivided into equally sized grid areas,*

*wherein at least one of the extractor, the low-frequency portion decoder, the provider, and the adaptor comprises a hardware implementation.*

* * * * *